(12) United States Patent
Kumai et al.

(10) Patent No.: US 10,088,730 B2
(45) Date of Patent: Oct. 2, 2018

(54) OPTICAL ELEMENT AND IMAGING DEVICE

(71) Applicant: ASAHI GLASS COMPANY, LIMITED, Chiyoda-ku (JP)

(72) Inventors: Hiroshi Kumai, Chiyoda-ku (JP); Shinya Tahara, Koriyama (JP); Teppei Konishi, Chiyoda-ku (JP); Koichi Nakagawa, Chiyoda-ku (JP); Takuji Oyama, Chiyoda-ku (JP); Satoshi Umeda, Koriyama (JP)

(73) Assignee: AGC Inc., Chiyoda-ku (JP)

( * ) Notice: Subject to any disclaimer, the term of this patent is extended or adjusted under 35 U.S.C. 154(b) by 0 days.

(21) Appl. No.: 15/492,466

(22) Filed: Apr. 20, 2017

(65) Prior Publication Data

US 2017/0219901 A1 Aug. 3, 2017

Related U.S. Application Data

(63) Continuation of application No. PCT/JP2015/079517, filed on Oct. 20, 2015.

(30) Foreign Application Priority Data

Oct. 21, 2014 (JP) .................................. 2014-214863

(51) Int. Cl.
*G02B 27/58* (2006.01)
*G02F 1/157* (2006.01)
(Continued)

(52) U.S. Cl.
CPC ............. *G02F 1/157* (2013.01); *G02B 27/58* (2013.01); *G02F 1/15* (2013.01); *G02F 1/163* (2013.01);
(Continued)

(58) Field of Classification Search
CPC . G02F 1/157; G02F 1/15; G02F 1/163; G02F 2001/1502; G02B 27/58; G03B 11/00
See application file for complete search history.

(56) References Cited

U.S. PATENT DOCUMENTS

| 5,663,829 A | 9/1997 | Lefrou et al. |
| 5,798,134 A | 8/1998 | Sato et al. |

(Continued)

FOREIGN PATENT DOCUMENTS

| CA | 2 744 247 | 6/2010 |
| CN | 102239444 A | 11/2011 |

(Continued)

OTHER PUBLICATIONS

International Search Report dated Dec. 15, 2015 in PCT/JP2015/079517 filed on Oct. 20, 2015 (with English translation).

(Continued)

*Primary Examiner* — Joseph P Martinez
(74) *Attorney, Agent, or Firm* — Oblon, McClelland, Maier & Neustadt, L.L.P.

(57) ABSTRACT

There is provided an optical element which is an apodized filter capable of externally controlling an optical characteristic and stable over a long period. An optical element 100 is an optical element including: a transparent electrolyte layer 110; a pair of solid electrochromic layers which sandwiches the transparent electrolyte layer 110; and further a pair of transparent conductive films 140 which sandwiches a pair of the solid electrochromic layer, wherein a pair of the solid electrochromic layers is constituted by a reduction coloring-type solid electrochromic layer 120 and an oxidation coloring-type solid electrochromic layer 130 opposing each other, the optical element including: an apodized characteristic in which transmittance increases gradually from an outer periphery toward a center in a plane orthogo- (Continued)

nal to a thickness direction of the transparent electrolyte layer 110.

13 Claims, 8 Drawing Sheets

(51) Int. Cl.
*G02F 1/15* (2006.01)
*G02F 1/163* (2006.01)
*G03B 11/00* (2006.01)

(52) U.S. Cl.
CPC ...... *G03B 11/00* (2013.01); *G02F 2001/1502* (2013.01)

(56) References Cited

U.S. PATENT DOCUMENTS

| | | |
|---|---|---|
| 5,831,760 A | 11/1998 | Hashimoto et al. |
| 5,956,170 A | 9/1999 | Miyagaki et al. |
| 6,277,523 B1 | 8/2001 | Giron |
| 6,859,297 B2 | 2/2005 | Lee et al. |
| 7,099,062 B2 | 8/2006 | Azens et al. |
| 7,428,090 B2 | 9/2008 | Fukazawa et al. |
| 7,722,966 B1 | 5/2010 | Lee et al. |
| 8,734,033 B2 | 5/2014 | Walters et al. |
| 8,736,945 B2 | 5/2014 | Pei |
| 2007/0139792 A1 | 6/2007 | Sayag |
| 2009/0027758 A1 | 1/2009 | Koshida et al. |
| 2010/0039689 A1 | 2/2010 | Sayag |
| 2010/0134866 A1 | 6/2010 | Foller et al. |
| 2013/0206323 A1 | 8/2013 | Blackburn et al. |
| 2014/0016173 A1 | 1/2014 | Gillaspie et al. |
| 2014/0022621 A1 | 1/2014 | Kailasam et al. |
| 2015/0192783 A1* | 7/2015 | Ishido .................. G02B 5/005 359/359 |

FOREIGN PATENT DOCUMENTS

| | | |
|---|---|---|
| CN | 104246544 A | 12/2014 |
| JP | 60-11577 | 1/1985 |
| JP | 3-87816 | 4/1991 |
| JP | 2961236 | 10/1999 |
| JP | 2007-248604 | 9/2007 |
| JP | 2009-521722 | 6/2009 |
| JP | 4684651 | 5/2011 |
| JP | 2012-510649 | 5/2012 |
| JP | 5177294 | 4/2013 |
| KR | 10-2008-0087005 | 9/2008 |
| KR | 10-2011-0102402 | 9/2011 |
| KR | 10-2013-0058745 | 6/2013 |
| TW | 201027234 A1 | 7/2010 |
| WO | WO 93/05438 | 3/1993 |
| WO | WO 94/15247 | 7/1994 |
| WO | WO 2007/075826 A2 | 7/2007 |
| WO | WO 2010/065713 A1 | 6/2010 |
| WO | WO 2013/161767 A1 | 10/2013 |
| WO | WO 2014/107613 A1 | 7/2014 |

OTHER PUBLICATIONS

Written Opinion dated Dec. 15, 2015 in PCT/JP2015/079517 filed on Oct. 20, 2015.

\* cited by examiner (1) VOLTAGE V=V₁     (a-1)     (b-1)

(2) VOLTAGE V=V₂     (a-2)     (b-2)

(3) VOLTAGE V=V₃     (a-3)     (b-3)

(4) VOLTAGE V=V₄     (a-4)     (b-4)

(5) VOLTAGE V=V₅     (a-5)     (b-5)

(a)

(b)

(a)

(b)

(c)

(d)

OPTICAL ELEMENT AND IMAGING DEVICE

CROSS-REFERENCE TO RELATED APPLICATIONS

This application is a continuation of prior International Application No. PCT/JP2015/079517 filed on Oct. 20, 2015, which is based upon and claims the benefit of priority from Japanese Patent Application No. 2014-214863 filed on Oct. 21, 2014; the entire contents of all of which are incorporated herein by reference.

FIFLD

The present invention relates to an optical element which is used for various optical devices and an imaging device, in more detail relates to the optical element which utilizes electrochromic and the imaging device equipped with the optical element.

BACKGROUND

Conventionally, there has been known an imaging device which mounts thereon an optical filter which intentionally shifts focus except a subject, what is called adjusts a blurred image in order to highlight part of the subject in a photographed image. Specifically, an apodized filter can be cited as an example, and for example, there has been disclosed a filter which is constituted so that transmittance of light decreases as separating from an optical center in a vertical direction to an optical axis, or the like [for example, refer to Reference 1 (WO 2013-161767 A1)].

By using such a filter, in particular, it is possible to relax a contour of the blurred image in a scene of portrait photographing, macro photographing, and the like in which depth of focus is shallow and obtain a high-quality image in which an aimed subject is shown up. On the other hand, in an apodized filter having a unique characteristic, namely, a fixed (unchangeable) characteristic in a transmittance distribution, the contour relaxation of the blurred image and a diameter of the blurred image are affected and so-called blurriness is impaired depending on the degree of transmittance of a peripheral edge portion and a central portion of the filter. Further, there has been known a problem that an exposure time is subjected to constraint by light intensity shortage, or the like.

With respect to the above-described problem, in a similar manner that a specific filter is selected mechanically by mounting a plurality of ND (Neutral Density) filters on a rotating rotor and interlocking them with a blade aperture, the above-described constraint can be avoided by mechanically replacing a plurality of apodized filters having a plurality of optical specifications depending on a photographing condition. However, the imaging device is required to become miniature and thin, and when, in particular, the plurality of apodized filters are mounted on a camera such as a mobile phone and a tablet PC which has constraint on a thickness, a mechanism part becomes complicated and it is spatially very difficult to practically mount them.

Therefore, as an apodized filter by which spatial advantage and flexibility of the transmittance distribution can be obtained, (one) apodized filter in which an optional optical characteristic can be selected actively by drive is required.

Meanwhile, in a solid-state imaging device which is mounted on a digital video camera, a digital still camera, and the like, there has been proposed an optical element which adjusts brightness using a light control function of an electrically controllable electrochromic and an imaging device which is equipped with the optical element [for example, refer to Reference 2 (JP-A 2007-248604)].

In Reference 2 in particular, by applying an optional voltage to a concentrically provided transparent electrode pattern instead of an exposure controlling mechanism part which performs a position adjustment of the ND filter with respect to an aperture opening of the solid-state imaging device or replacement of the ND filter different in a light shielding property and an opening area, color development/reduction of electrochromic layers stacked uniformly on the transparent electrodes is controlled and transmitted light intensity is adjusted concentrically, and thereby an aperture function is exhibited. Thus, applying gradient electric potential concentrically makes it possible to form a pseudo continuous transmitted light intensity distribution and obtain the aperture function. However, there has been a problem that a plurality of transparent electrodes are each used as an independent transparent electrode, thereby causing a boundary of electric potential (gap between adjacent transparent electrodes), and further a plurality of routed wiring parts for power feeding are necessary toward a central portion of the concentric circles, thereby inevitably causing light intensity unevenness as an aperture.

Under such circumstances, there has been proposed an apodized filter in which in a cell sandwiched by two transparent conductive layer-attached substrates, an inner surface of one of the substrates is formed as non-flatness, and an electrochromic solution is sealed in the cell [for example, refer to Reference 3 (JP-A 2012-510649)]. Reference 3 discloses that an applied voltage from the outside causes the color development/reduction of this electrochromic solution, and thereby transmitted light intensity of light can be varied by a coloring concentration distribution derived from the non-flatness and an optical characteristic can be controlled from outside.

SUMMARY

However, in the apodized filter in Reference 3, an electrochromic material is dissolved in a solvent and sealed in the cell, so that an uneven distribution of the electrochromic material due to long-term use, and the like make it difficult to secure long-term reliability of a uniform color correction in a visible light region. The present invention has been made in consideration of the above-described problems, and it is an object thereof to provide an optical element which is an apodized filter capable of externally controlling an optical characteristic and in which a stable optical characteristic can be obtained over a long period, and an imaging device equipped with the optical element.

An optical element of the present invention includes: a transparent electrolyte layer; a pair of solid electrochromic layers constituted by a reduction coloring-type solid electrochromic layer and an oxidation coloring-type solid electrochromic layer opposing each other, sandwiching the transparent electrolyte layer; and a pair of transparent conductive films which sandwiches a pair of the solid electrochromic layers, the optical element including an apodized characteristic having transmittance gradually increasing from an outer periphery toward a center in a plane orthogonal to a thickness direction of the transparent electrolyte layer.

An imaging device of the present invention includes: an image sensor on which light from a subject or a light source is incident; a lens which is disposed between the subject or the light source and the image sensor; and the above-described optical element of the present invention which is disposed between the subject or the light source and the image sensor.

DETAILED DESCRIPTION

Figure 1A:
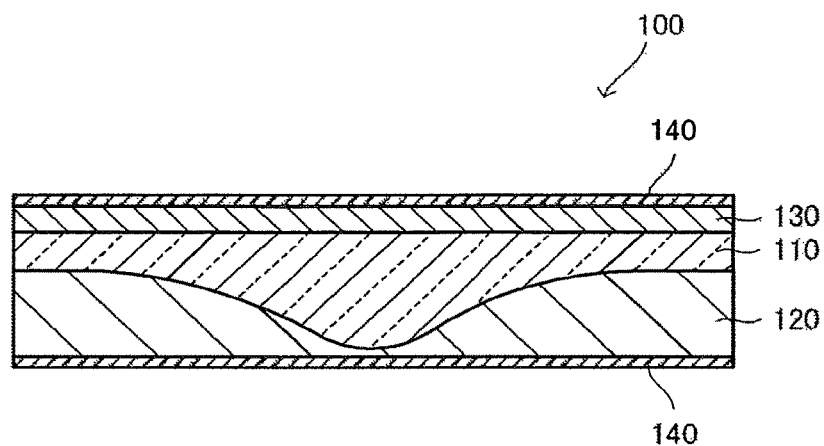
FIG. 1A is a view illustrating a schematic configuration of an externally controllable apodized optical element which is one embodiment of the present invention.

Hereinafter, an optical element and an imaging device of the present invention will be described in detail referring to the drawings.

First Embodiment

Optical Element

First, a first embodiment indicating one embodiment of the present invention will be described. FIG. 1A illustrates a sectional view of an optical element according to this first embodiment. An optical element 100 illustrated in this FIG. 1A is constituted by including: a transparent electrolyte layer 110; a pair of solid electrochromic layers (a reduction coloring-type solid electrochromic layer 120, an oxidation coloring-type solid electrochromic layer 130) which sandwiches the transparent electrolyte layer 110; and further a pair of transparent conductive films 140 which sandwiches a pair of the solid electrochromic layers. Note that "optical element" is sometimes indicated as "apodized optical element" in this description.

Transparent Electrolyte Layer

The transparent electrolyte layer 110 is the one which makes it possible that ions (cation such as $H^+$, $Li^+$, $Na^+$, $A_g^+$, or $K^+$, or $OH^-$-type anion) involved in an electrochromic phenomenon move to the electrochromic layers 120, 130 reversibly and simultaneously and which is capable of blocking a movement of electrons, and formed of a transparent material.

This transparent electrolyte layer 110 is formed in a convex shape corresponding to a concave shape of the later-described reduction coloring-type solid electrochromic layer 120. Note that a contact surface with the other oxidation coloring-type solid electrochromic layer 130 is a flat surface in this embodiment. Accordingly, the transparent electrolyte layer 110 is formed so as to have the thickest thickness at a central portion thereof, and is formed so as to become thinner gradually from the central portion toward an outer periphery thereof.

A material which forms this transparent electrolyte layer 110 may be a one having the above-described function and a relatively stable one from chemical and electrical points of view. As such a material, there can be cited an organic material, an inorganic material, or a composite material of the organic material and the inorganic material. Further, these materials can be used in any form of a solid state, a gel state, or a liquid state. As polymers in the gel state, for example, there can be cited polymers which exhibit proton conduction such as hydrocarbon-based proton conducting polymers, their fluorine-substituted proton conducting polymers, and a lithium-ion conducting polymer.

A polymer electrolyte in the gel state can be obtained by polymerizing (i) a eutectic mixture constituted by containing a compound having an acid functional group and a basic functional group and salt capable of ionization and (ii) an electrolyte precursor solution containing a monomer capable of forming a gel-state polymer by a polymerization reaction.

(i) the eutectic mixture to be used here is used as an electrolyte component. In general, because the eutectic mixture does not have vapor pressure, there is no problem of evaporation and depletion of the electrolyte, and thereby the eutectic mixture is very stable and can suppress a side reaction in this optical element. As this eutectic mixture, for example, there can be cited a eutectic mixture of an amide-based compound such as acetamide or urea and salt capable of the ionization, and a cation component which forms the salt capable of the ionization is preferably tetraammonium, magnesium, sodium, potassium, lithium, calcium, or the like, and an anion component is preferably thiocyanate, formate, acetate, nitrate, perchlorate, sulfate, hydroxide, alkoxide, halide, carbonate, oxalate, tetrafluoroborate, or the like.

Moreover, as long as the monomer which is contained in (ii) the electrolyte precursor solution is capable of forming a polymer in the gel state by the polymerization reaction of the monomer, it is not particularly limited, and various types of monomers are applicable. As such monomers, for example, there can be cited acrylonitrile, methyl methacrylate, methyl acrylate, methacrylonitrile, methylstyrene, vinylesters, vinyl chloride, vinylidene chloride, acrylamide, tetrafluoroethylene, vinyl acetate, vinyl chloride, methyl vinyl ketone, ethylene, styrene, para-methoxystyrene, para-cyanostyrene, or the like.

As such monomers, moreover, for example, there can be cited a copolymer of β-hydroxyethyl methacrylate and 2-acrylamide-2-methylpropanesulfonic acid, a water-containing vinyl polymer such as a water-containing methyl methacrylate copolymer, water-containing polyester, a fluorine-based polymer, and the like. Further, there can be cited an aromatic hydrocarbon-based polymer having a polyetheretherketone-based, polyphenylene sulfide-based, polyimide-based, or polybenzazole-based aromatic ring in its main chain skeleton and having a sulfonic acid group, and the like. As the fluorine-based polymer, specifically, Flemion (registered trademark) (made by ASAHI GLASS COMPANY, product name), Nafion (registered trademark) (made by Du Pont, product name), Aciplex (registered trademark) (made by Asahi Kasei Corporation, product name), and the like can be exemplified.

As a parameter which affects electric conductivity of an electrolyte, in a sulfonic acid group-containing fluoropolymer such as Flemion or Nafion (registered trademark), an ion exchange capacity can be defined. The ion exchange capacity indicates equivalent weight of a sulfonic acid group per polymer dry weight, and the electric conductivity of the electrolyte tends to become higher as the ion exchange capacity becomes large. The higher the electric conductivity of the electrolyte is in an electrochromic phenomenon, the faster response speed tends to become, and the ion exchange capacity is preferably a 0.5 mEq/g dry resin or more from the viewpoint of a high-speed response. Moreover, in consideration of the response speed required of the optical element which is applied to the imaging device, the ion exchange capacity is preferably a 0.8 mEq/g dry resin or more. Further, when content of the sulfonic acid group is increased in order to increase the ion exchange capacity, water resistance decreases, and therefore an upper limit of the ion exchange capacity is preferably a 2.0 mEq/g dry resin or less, and in consideration of an effect on making a thick-film coating difficult, which is derived from a decrease in viscosity of a solution due to the increase in the sulfonic acid group , a 1.5 mEq/g dry resin or less is further preferred.

Further, in the inorganic material whose electrolyte has ion conductivity but has an electron-insulating property, specifically, in a case of $H^+$ from the viewpoint of good conductivity of ions, it is possible to be selected in a form of hydrate or non-hydrate of a metal oxide or a mixture of the metal oxide. As this metal oxide, β-aluminum oxide (β-$Al_2O_3$.$nH_2O$), tungsten oxide ($WO_3$.$nH_2O$), niobium oxide ($Nb_2O_5$.$nH_2O$), tin oxide ($SnO_2$.$nH_2O$), bismuth oxide ($Bi_2O_3$.$nH_2O$), titanium oxide ($TiO_2$.$nH_2O$), vanadium oxide ($V_2O_5$.$nH_2O$), nickel oxide ($NiOxH_y$.$nH_2O$), molybdenum oxide ($MoO_3$.$nH_2O$), and the like are exemplified, and all the hydrated oxides which are exemplified here are n≥0. In order to make hydrates further stabilized, another metal different from main metal of the exemplified oxides, as an example, atoms of Ti, Ta, rhenium, or the like, may be contained, further, an alkali metal such as Na, Li, or K may be added, and $Na_3Zr_2Si_2PO_{12}$, $Na_{1+x}Zr_2Si_xP_{3-x}O_{12}$ (0≤5 x≤3), $Na_5YSi_{14}O_{12}$, $RbAg_4I_5$, or the like can be used.

Further, in a case of a lithium ion $Li^+$ from the viewpoint of the good conductivity of ions, it is possible to be selected from a Li-containing or non-containing metal oxide, a mixture of the metal oxide, or the like, and nickel oxide ($NiO_x$) (0<x≤1.5), nickel oxide containing lithium ($Li_xNiO_2$) (0≤x≤1), a mixture of titanium oxide and cerium oxide ($CeTiO_x$) (0<x≤4), tungsten oxide ($WO_3$), niobium oxide ($Nb_2O_5$), vanadium oxide ($V_2O_5$), vanadium oxide containing lithium ($Li_xV_2O_5$) (0<x≤2), and the like are exemplified.

Moreover, from the viewpoint of a good conductor of ions and an insulating material which blocks the movement of electrons more, a selection is made from an oxide of Group VB metal in Periodic Table and tantalum oxide ($Ta_2O_5$), and a selection is also made from oxides such as antimony oxide ($Sb_2O_5$), zirconium oxide ($ZrO_2$), titanium oxide ($TiO_2$), silicon oxide ($SiO_2$), chromium oxide ($CrO_3$), and germanium oxide ($GeO_3$). Moreover, hafnium oxide ($HfO_2$), yttrium oxide ($Y_2O_5$), lanthanum oxide ($La_2O_5$), magnesium fluoride, zirconium phosphate, or zinc oxide in a form of $ZnO(H_3PO_4)_2$.$nH_2O$ (n≥0), or an optional hydrate or mixed substances among the formerly described substances is/are applicable, or the latter hydrated oxides are also applicable.

Moreover, as electrolyte materials, it is possible to select $CeF_3$, $MgF_2$, $CaF_2$, LiF, $Na_3AlF_6$, or a mixture of these, or a layer of an electron insulating material based on $Li_3N$, $LiTaO_3$, $LiAlF_4$, $Li_3PO_4$, $LiPO_2$, LiN, $LiNbO_3$, $MgF_2POLi$, or $Li_2WO_4$, and the latter (layer of an electron insulating material based on the above-described $Li_3N$, $LiTaO_3$, . . . $Li_2WO_4$) material is further preferred in the case of the lithium ion $Li^+$. Such electrolyte materials can be used in any form of the solid state, the gel state, or the liquid state as described above. Among them, from the viewpoint of an increase in a moving speed of ions and a response characteristic of color development/reduction, and from the viewpoint of ease application to seal sealing and reliability, a form in the liquid state is often preferably used.

As an electrolyte in the liquid state, there can be cited an aqueous electrolyte in which an ionic substance is dissolved in water or an organic electrolyte in which the ionic substance is dissolved in an organic solvent, but the organic electrolyte is preferred from the viewpoint of the reliability. As the electrolyte material which is applied to the organic electrolyte, Li, Na, K, or the like can be cited, but a Li system whose electric conductivity is the highest is preferred from the viewpoint of the response speed.

As a configuration of a liquid-state Li-based electrolyte, the liquid-state Li-based electrolyte is constituted of Li salt as a supporting electrolyte which is engaged in Li ion implantation and a polar solvent which dissolves the salt, and a polymer soluble in the same solvent, for viscosity adjustment, or the like may be added as necessary. Further, after a polymerizable compound is mixed in this electrolyte and the mixture is injected into an empty cell in an element in which chromic layers have already been formed, or the like, the resultant may be post cured by UV light, heat, or the like.

As the Li salt, for example, the following alkali metal salt or the like can be cited.

There can be cited $LiClO_4$, $LiPF_6$, LiTFSI (lithium bistrifluoromethane sulfon imide), LiI, $LiBF_4$, $CF_3SO_3Li$, $CF_3COOLi$, or the like, and as a nonrestrictive example of an electrolyte solvent, there can be cited propylene carbonate, ethylene carbonate, acetonitrile, γ-butyrolactone, methoxypropionitrile, 3-ethoxypropionitrile, triethylene glycol dimethyl ether, sulfolane, dimethyl sulfoxide, dimethylformamide, or the like, or a mixture of these, or the like.

Further, an ionic liquid which has been under active development in recent years or the like can also be applied as the polar solvent of the Li-based electrolyte. The ionic liquid is constituted of a cation portion and a counter anion portion, and as the cation portion, there can be cited an imidazolium system, an alkylammonium system, a pyridinium system, a pyrrolidinium system, a phosphonium system, or the like. As the counter anion portion, there can be cited halogen, $AlCl_4$—, $PF_6$—, TFSI—, or the like. Among them, 1-ethyl-3-methylimidazolium bistrifluoromethanesulfonimide or the like is known from the viewpoint of ion conductance, but this is not restrictive.

The above-described electrolyte materials may further contain an additive having hydrophilicity which increases the degree of their hydration. As such an additive, for example, a metal such as W or Re can be preferably cited, and an alkali metal of Li, Na, or K type can also be used. These additives preferably exhibit the effect in an addition amount corresponding to only a few % by weight with respect to the material which forms the layer.

As described above, it is preferable that the material which is used for the transparent electrolyte layer 110 is selected from a material which does not affect a material of the reduction coloring-type solid electrochromic layer 120 and a material of the oxidation coloring-type solid electrochromic layer 130 which are placed on both its sides, has adhesion strength between both these layers, has follow-up ability to mechanical deformation, and is transparent.

At this time, a thickness of the transparent electrolyte layer 110 may be determined according to a required element (optical) characteristic in a range of 0.001 μm to 20 μm according to a characteristic of the optical element 100. Note that in this embodiment, a thickness of at least one type of the solid electrochromic layers is not uniform and has a distribution of the thickness, and accordingly the transparent electrolyte layer also has the distribution of the thickness.

Solid Electrochromic Layer

Here, the solid electrochromic layers function as a light-absorbing variable part which allows color development and color reduction to be controlled reversibly by applying voltage. In these solid electrochromic layers, light transmittance is high and transparency becomes high at a time of the color reduction, and the light transmittance lowers and a light shielding property becomes high at a time of the color development. Note that in this description, "light transmittance" is sometimes represented as "transmittance".

Figure 1B:
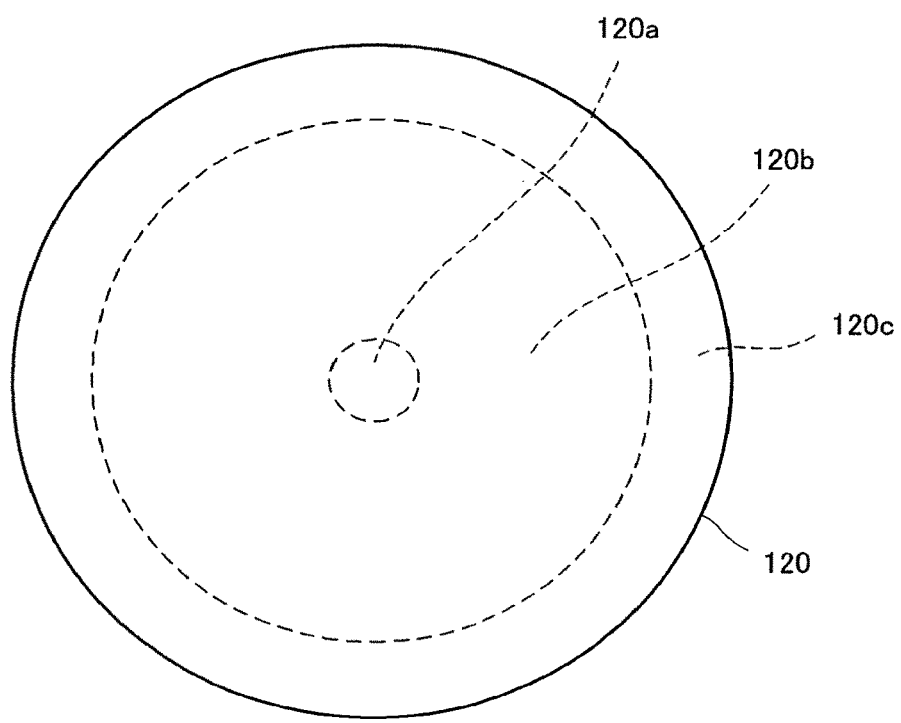
FIG. 1B is a plan view of a reduction coloring-type solid electrochromic layer in FIG. 1A.

These solid electrochromic layers are provided so that different types of respective solid electrochromic materials sandwich the transparent electrolyte layer 110, and one may be a layer formed of a reduction coloring-type solid electrochromic material and the other may be a layer formed of an oxidation coloring-type solid electrochromic material. In FIG. 1, the solid electrochromic layers are constituted of the reduction coloring-type solid electrochromic layer 120 and the oxidation coloring-type solid electrochromic layer 130, and these layers constitute the light-absorbing variable part in the optical element 100.

In this embodiment, the reduction coloring-type solid electrochromic layer 120 is formed so as to be the thinnest at a central portion 120a and become thicker gradually from the central portion 120a toward an outer peripheral portion 120c. Such formation makes the transmittance high at the central portion 120a and makes the transmittance low in the outer peripheral portion 120c in a transmittance characteristic of light when the reduction coloring-type solid electrochromic layer 120 is in a color development state. Further, since the reduction coloring-type solid electrochromic layer 120 is formed so that a thickness becomes thinner gradually from the outer peripheral portion 120c toward the central portion 120a, an optical characteristic thereof has an apodized characteristic in which the transmittance increases gradually from the outer peripheral portion 120c toward the central portion 120a.

In contrast to this, the oxidation coloring-type solid electrochromic layer 130 which is provided to sandwich the transparent electrolyte layer 110 therebetween is formed in a planar shape (substantially uniform thickness), and the light transmittance is substantially constant in its central portion and outer peripheral portion.

Figure 2:
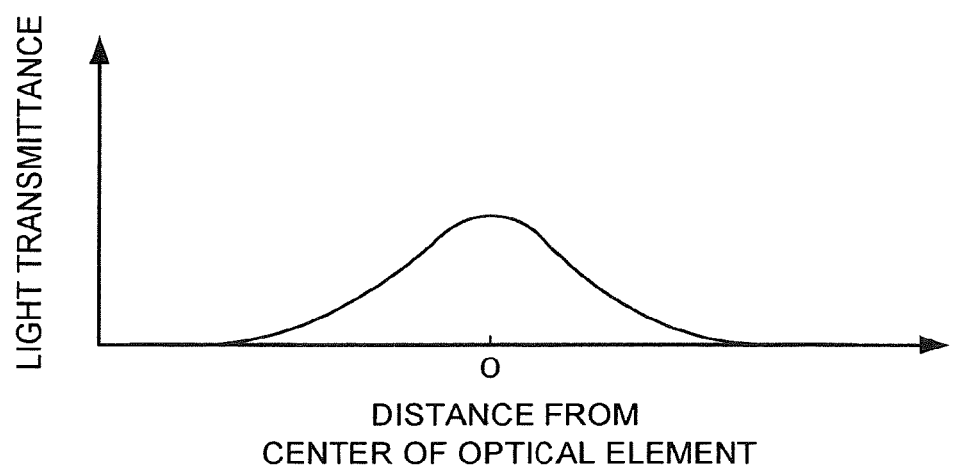
FIG. 2 is a diagram illustrating a transmittance characteristic of the optical element in FIG. 1A.

In this embodiment, the above-described reduction coloring-type solid electrochromic layer 120 and oxidation coloring-type solid electrochromic layer 130 are used in combination. Thereby, as illustrated in FIG. 2, the optical element 100 which uses them results in the one which reflects the apodized characteristic of the reduction coloring-type solid electrochromic layer 120, in which the transmittance of visible light is the highest at the central portion and decreases gradually from the central portion toward the outer peripheral portion. Moreover, as a light absorbing property of the optical element 100, a characteristic which combines the color development of the reduction coloring-type solid electrochromic layer 120 and the color development of the oxidation coloring-type solid electrochromic layer 130 is exhibited, resulting in a color tone closer to a black color rather than when one of the above-described two types of solid electrochromic layers is used alone. Note that in this embodiment, light means visible light whose wavelengths are in a range of 430 nm to 660 nm.

Further, the reduction coloring-type solid electrochromic layer 120 is formed so that the central portion 120a is the thinnest and the outer peripheral portion 120c is the thickest as described above, but a uniform portion may exist in film thickness. For example, a film thickness of the central portion 120a may be uniform (the thinnest), part or the whole of a film thickness of an intermediate portion 120b between the central portion 120a and the outer peripheral portion 120c may be uniform, and a film thickness of the outer peripheral portion 120c may be uniform (the thickest).

However, in this embodiment, the film thickness of the reduction coloring-type solid electrochromic layer 120 is provided so as to change continuously, so that there is no portion which has a discontinuous thickness such as a step. As long as there is the discontinuous portion, the light transmittance also changes discontinuously in the stepped portion, so that there is a possibility that a good apodized characteristic cannot be obtained. Note that shapes of these layers can be appropriately changed depending on optical design.

Further, as long as in the above-described reduction coloring-type solid electrochromic layer 120, the central portion 120a is the thinnest and the outer peripheral portion 120c is the thickest, the layer need not be formed at the central portion 120a. That is, the reduction coloring-type solid electrochromic layer 120 need not exist at the central portion 120a. In this case, it is preferable that a layer of an opposite face in the oxidation coloring-type solid electrochromic layer 130 which electrochemically has a complementary relationship of oxidation-reduction does not exist. This configuration makes an area where the transmittance is high always exist in the central portion of the optical element 100, thereby making it possible to variably control a high-transmission apodized characteristic in which a transmittance loss in the entire optical element is small while relatively restraining a voltage width to be applied.

As materials which form these reduction coloring-type solid electrochromic layer 120 and oxidation coloring-type solid electrochromic layer 130, publicly known electrochromic materials can be used for each of them without being particularly limited.

As a reduction coloring-type solid electrochromic material, for example, there can be cited tungsten trioxide ($WO_3$), molybdenum trioxide ($MoO_3$), or the like. These materials may be each used alone, and in order to change a color tone at a time of the color development, two or more types of the materials may be compounded to be used. Making a composite oxide allows flattening of a transmittance spectrum at a time of the color reduction, control of an absorption band at a time of the color development, and the like. Further, in order to approach a neutral color tone in a wide wavelength band, for example, an additive of $TiO_2$ or the like which corrects a color tone may be added thereto. By making the composite oxide using $TiO_2$, absorption in a visible light wavelength band of the reduction coloring-type solid electrochromic approaches a flat, thereby resulting in allowing neutralization of the color tone.

As an oxidation coloring-type solid electrochromic material, for example, there can be cited oxide, hydroxide, or hydrated oxide which contains a metal selected from Ni, Ir, Cr, V, Mn, Cu, Co, Fe, W, Mo, Ti, Pr, and Hf. Moreover, the oxide, hydroxide, or hydrated oxide may be a composite oxide, a composite hydroxide, or a composite hydrated oxide with one type or two or more types of elements selected from a group composed of Li, Ta, Sn, Mg, Ca, Sr, Ba, Al, Nb, Zr, In, Sb, and Si. Moreover, these oxidation coloring-type solid electrochromic materials may be used as a dispersion which is obtained by dispersing them in a dispersion medium of ITO, ZnO, $MgF_2$, $CaF_2$, or the like. In this oxidation coloring-type solid electrochromic material, in consideration of the light transmittance in an oxidation color-development state thereof and a reduction color-reduction state thereof and a wavelength dispersion state thereof, a material to be used may be determined.

Transparent Conductive Film

The transparent conductive films 140 are a pair of members which further sandwiches a pair of the solid electrochromic layers (reduction coloring-type solid electrochromic layer 120, oxidation coloring-type solid electrochromic layer 130) which sandwiches the above-described transparent electrolyte layer 110, and producing a potential difference between a pair of these transparent conductive films 140 makes it possible to apply voltage between the transparent conductive films 140.

As a material which forms this transparent conductive film 140, there can be cited a thin metal film of Ag, Cr, or the like, a metal oxide such as tin oxide, zinc oxide, tin oxide ($SnO_2$) which dopes another oxide with a small amount of a component thereof, ITO, FTO, IZO, indium oxide ($In_2O_5$), or the like, or a mixture of these. A forming method of the transparent electrode film is not particularly limited, but a publicly known ordinary method, for example, a vacuum deposition method, an ion plating method, an electron beam vacuum deposition method, a sputtering method, or the like can be used.

In these transparent conductive films 140, it is preferable that a sheet resistance value is as low as possible for a reason why too high sheet resistance thereof causes loss of electricity necessary for the solid electrochromic layers, and thereby a dynamic range of the color development/reduction decreases, a response time when the color development and the color reduction change is delayed, or the like. Specifically, 100 Ω/sq. or less is preferred, 50 Ω/sq. or less is more preferred, and 10 Ω/sq. or less is further preferred. Thicknesses of the transparent conductive films 140 are each preferably 0.01 μm to 0.5 μm and may be determined in consideration of the transmittance of the visible light wavelength band of the transparent conductive films.

Transparent Support Substrate

Note that ordinarily, the above-described optical element 100 has a transparent support substrate on its single surface or both its surfaces. A shape of the optical element 100 is retained stably by this transparent support substrate. As long as this transparent support substrate is a one which has transparency and has predetermined strength, it can be used without being particularly limited, and as a material thereof; for example, there can be cited glass, ceramics, or resin.

Here, publicly known glass can be used as the glass, for example, there can be cited soda lime glass, borosilicate glass, alkali-free glass, quartz glass, and the like. Further, as infrared cut glass, there can be also cited glass in which CuO or the like is added to fluorophosphate-based glass, phosphate-based glass, or the like and which has a light absorbing property. Further, in an image sensor, glass in which a low-pass filter and a wavelength plate function are compounded and which has birefringent crystal such as crystalline quartz, lithium niobate, or sapphire can also be used.

Further, a publicly known transparent resin can be used as the resin, and there can be cited a thermoplastic resin such as polyethylene terephthalate (PET), polyethylene naphthalate (PEN), polybutylene terephthalate (PBT), polycarbonate (PC), or cycloolefin (COP) or a thermosetting resin such as polyimide (PI), polyetherimide (PEI), polyamide (PA), or polyamide-imide (PAI). Moreover, when the resin is formed as a concave molded body or a convex molded body by an imprint or the like, an energy ray-curable resin such as acrylic or epoxy can be used.

Thicknesses of these transparent support substrates are not particularly limited, but from the viewpoint of achieving reduction in weight and thinning, when the transparent support substrate is provided on only the single surface, a range of 0.01 mm to 1 mm is preferred and a range of 0.03 mm to 0.1 mm is more preferred.

Further, when the transparent support substrates are provided on both the surfaces of the above-described optical element 100, a thickness of each of the transparent support substrates is preferably in a range of 0.01 mm to 0.03 mm and further preferably in a range of 0.01 mm to 0.02 mm. Note that as long as the thicknesses of the respective transparent support substrates on both the surfaces are the same, warps of the substrates can be suppressed, which is preferred. Further, from the viewpoint of mechanical strength, the optical element which is sandwiched by these transparent support substrates on both the surfaces may be used by sticking it on part of an element member of an imaging camera. As described above, as a material of the transparent support substrate, the one whose mechanical strength is strong and whose shielding ability against oxygen and moisture in the air, or the like is high can be used.

Shielding Layer

Further, in this embodiment, at least one of between the reduction coloring-type solid electrochromic layer 120 and the transparent electrolyte layer 110 and between the oxidation coloring-type solid electrochromic layer 130 and the transparent electrolyte layer 110, a (non-illustrated) shielding layer may be formed. The shielding layer in this embodiment is constituted of a transparent material which does not prevent movement of ions between the respective layers and may be formed by a chemically inactive material with the transparent electrolyte layer 110, the reduction coloring-type solid electrochromic layer 120, and the oxidation coloring-type solid electrochromic layer 130.

There is a possibility that the reduction coloring-type solid electrochromic layer 120 changes in quality and deteriorates due to moisture derived from a proton conductive ion of the transparent electrolyte layer 110 or the oxidation coloring-type solid electrochromic layer changes in quality and deteriorates due to acid. Hence, metal ions are sometimes eluted from the electrochromic layers gradually by, in particular, an acid hydrated ion which an acidic group such as a sulfonic acid group or a carboxylic acid group has, or the like. However, forming this shielding layer between the respective layers makes it possible to suppress such trouble.

That is, providing this shielding layer makes it possible to drive the respective layers stably over a long period and improve reliability and stability of the optical element without direct contact of the transparent electrolyte layer 110 with the reduction coloring-type solid electrochromic layer 120 and/or the oxidation coloring-type solid electrochromic layer 130.

Note that when the shielding layer is provided on either of the betweennesses, disposing it on a side of the oxidation coloring-type solid electrochromic layer 130 relatively inferior in stability, namely, between the oxidation coloring-type solid electrochromic layer 130 and the transparent electrolyte layer 110 makes it possible to obtain improvement in the reliability, which is therefore preferred. Further, in order to enhance the stability and reliability more as the optical element, it is preferable to provide the shielding layers both, between the reduction coloring-type solid electrochromic layer 120 and the transparent electrolyte layer 110, and between the oxidation coloring-type solid electrochromic layer 130 and the transparent electrolyte layer 110.

As a material constituting this shielding layer, there can be used, besides $TaO_x$ or $TaN_x$, $SiO_x$, $LiO_x$, $LiN_x$, $NaO_x$, $KO_x$, $RbO_x$, $CsO_x$, $BeO_x$, $MgO_x$, $MgN_x$, $CaO_x$, $CaN_x$, $SrO_x$, $BaO_x$, $ScO_x$, $YO_x$, $YN_x$, $LaO_x$, $LaN_x$, $CeO_x$, $PrO_x$, $NdO_x$, $SmO_x$, $EuO_x$, $GdO_x$, $TbO_x$, $DyO_x$, $HoO_x$, $ErO_x$, $TmO_x$, $YbO_x$, $LuO_x$, $TiO_x$, $TiN_x$, $ZrO_x$, $ZrN_x$, $HfO_x$, $HfN_x$, $ThO_x$, $VO_x$, $VN_x$, $NbO_x$, $NbN_x$, $CrO_x$, $CrN_x$, $MoO_x$, $MoN_x$, $WO_x$, $WN_x$, $MnO_x$, $ReO_x$, $FeO_x$, $FeN_x$, $RuO_x$, $OsO_x$, $CoO_x$, $RhO_x$, $IrO_x$, $NiO_x$, $PdO_x$, $PtO_x$, $CuO_x$, $CuN_x$, $AgO_x$, $AuO_x$, $ZnO_x$, $CdO_x$, $HgO_x$, $BO_x$, $BN_x$, $AlO_x$, $AlN_x$, $GaO_x$, $GaN_x$, $InO_x$, $SiN_x$, $GeO_x$, $SnO_x$, $PbO_x$, $PO_x$, $PN_x$, $AsO_x$, $SbO_x$, $SeO_x$, $TeO_x$, or the like. Note that here, x is the number of oxygen atoms or the number of nitrogen atoms in a chemical formula of each oxide or each nitride, and is appropriately determined depending on an oxidation state where the oxide or the nitride can be taken as a compound to be constituted.

Further, there can also be used $LiAlO_2$, $Li_2SiO_3$, $Li_2TiO_3$, $Na_2Al_{22}O_{34}$, $NaFeO_2$, $Na_4SiO_4$, $K_2SiO_3$, $K_2TiO_3$, $K_2WO_4$, $Rb_2CrO_4$, $Cs_2CrO_4$, $MgAl_2O_4$, $MgFe_2O_4$, $MgTiO_3$, $CaTiO_3$, $CaWO_4$, $CaZrO_3$, $SrFe_{12}O_{19}$, $SrTiO_3$, $SrZrO_3$, $BaAl_2O_4$, $BaFe_{12}O_{19}$, $BaTiO_3$, $Y_3Al_5O_{12}$, $Y_3Fe_5O_{12}$, $LaFeO_3$, $La_3Fe_5O_{12}$, $La_2Ti_2O_7$, $CeSnO_4$, $CeTiO_4$, $Sm_3Fe_5O_{12}$, $EuFeO_3$, $Eu_3Fe_5O_{12}$, $GdFeO_3$, $Gd_3Fe_5O_{12}$, $DyFeO_3$, $Dy_3Fe_5O_{12}$, $HoFeO_3$, $Ho_3Fe_5O_{12}$, $ErFeO_3$, $Er_3Fe_5O_{12}$, $Tm_3Fe_5O_{12}$, $LuFeO_3$, $Lu_3Fe_5O_{12}$, $NiTiO_3$, $Al_2TiO_5$, $FeTiO_3$, $BaZrO_3$, $LiZrO_3$, $MgZrO_3$, $HfTiO_4$, $NH_4VO_3$, $AgVO_3$, $LiVO_3$, $BaNb_2O_6$, $NaNbO_3$, $SrNb_2O_6$, $KTaO_3$, $NaTaO_3$, $SrTa_2O_6$, $CuCr_2O_4$, $Ag_2CrO_4$, $BaCrO_4$, $K_2MoO_4$, $Na_2MoO_4$, $NiMoO_4$, $BaWO_4$, $Na_2WO_4$, $SrWO_4$, $MnCr_2O_4$, $MnFe_2O_4$, $MnTiO_3$, $MnWO_4$, $CoFe_2O_4$, $ZnFe_2O_4$, $FeWO_4$, $CoMoO_4$, $CoTiO_3$, $CoWO_4$, $NiFe_2O_4$, $NiWO_4$, $CuFe_2O_4$, $CuMoO_4$, $CuTiO_3$, $CuWO_4$, $Ag_2MoO_4$, $Ag_2WO_4$, $ZnAl_2O_4$, $ZnMoO_4$, $ZnWO_4$, $CdSnO_3$, $CdTiO_3$, $CdMoO_4$, $CdWO_4$, $NaAlO_2$, $MgAl_2O_4$, $SrAl_2O_4$, $Gd_3Ga_5O_{12}$, $InFeO_3$, $MgIn_2O_4$, $Al_2TiO_5$, $FeTiO_3$, $MgTiO_3$, $NaSiO_3$, $CaSiO_3$, $ZrSiO_4$, $K_2GeO_3$, $Li_2GeO_3$, $Na_2GeO_3$, $Bi_2Sn_3O_9$, $MgSnO_3$, $SrSnO_3$, $PbSiO_3$, $PbMoO_4$, $PbTiO_3$, $SnO_2$—$Sb_2O_3$, $CuSeO_4$, $Na_2SeO_3$, $ZnSeO_3$, $K_2TeO_3$, $K_2TeO_4$, $Na_2TeO_3$, or $Na_2TeO_4$.

Second Embodiment

Figure 3A:
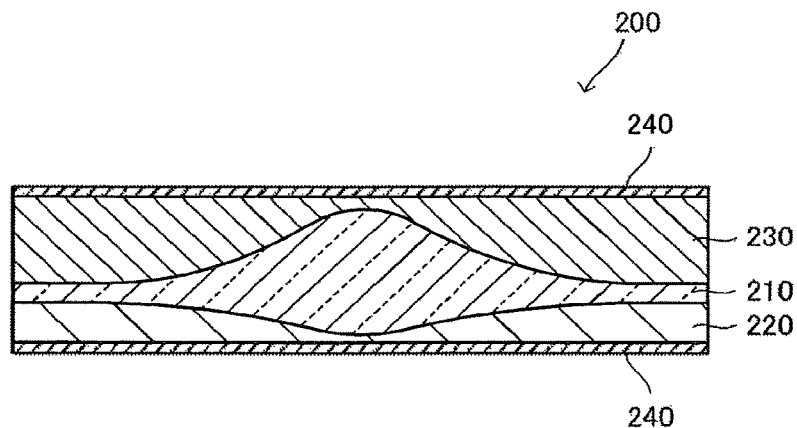
FIG. 3A is a view illustrating a schematic configuration of an externally controllable apodized optical element which is another embodiment of the present invention.

Next, a second embodiment which indicates another embodiment of the present invention will be described. FIG. 3A illustrates a sectional view of an optical element according to this second embodiment. An optical element 200 illustrated in this FIG. 3A is constituted by including: a transparent electrolyte layer 210; a pair of solid electrochromic layers (a reduction coloring-type solid electrochromic layer 220, an oxidation coloring-type solid electrochromic layer 230) which sandwiches the transparent electrolyte layer 210; and further, a pair of transparent conductive films 240 which sandwiches a pair of the solid electrochromic layers.

To the optical element 200 in this second embodiment, the same configuration and material as those of the optical element 100 in the first embodiment can be basically applied. Specifically, to the transparent conductive films 240 and the reduction coloring-type solid electrochromic layer 220, entirely the same ones as the transparent conductive films 140 and the reduction coloring-type solid electrochromic layer 120 can be applied, respectively. Further, to the transparent electrolyte layer 210 and the oxidation coloring-type solid electrochromic layer 230, the same materials as those in the first embodiment can be applied except that the shapes are different.

Hereinafter, in this embodiment, a point different from the first embodiment will be described referring to the drawings. As illustrated in FIG. 3A, in this second embodiment, the oxidation coloring-type solid electrochromic layer 230 does not have a substantially uniform thickness, is formed the thinnest at a central portion thereof, and is formed so as to become thicker gradually from the central portion toward an outer peripheral portion thereof, similarly to the reduction coloring-type solid electrochromic layer 120 of the first embodiment.

Accordingly, in this embodiment, both the reduction coloring-type solid electrochromic layer 220 and the oxidation coloring-type solid electrochromic layer 230 are thin at the central portions and thick in the outer peripheral portions, and formed so as to become thicker gradually from the central portions toward the outer peripheral portions.

Therefore, with respect to not only the reduction coloring-type solid electrochromic layer 220 but also the oxidation coloring-type solid electrochromic layer 230, the transparent electrolyte layer 210 is formed so as to become a shape (convex shape) corresponding to a surface shape thereof (concave shape) and has a biconvex-shaped cross section.

Thus, both thicknesses of two types of the solid electrochromic layers are formed so as to become thicker gradually from the central portions toward the outer peripheral portions, thereby indicating a light transmittance characteristic similar to the apodized characteristic illustrated in FIG. 2 similarly to the first embodiment when both the reduction coloring-type solid electrochromic layer 220 and the oxidation coloring-type solid electrochromic layer 230 are in the color development state. Note that in this second embodiment, the apodized characteristic is more easily obtained than the first embodiment, and further because both two types of the solid electrochromic layers to be used are formed so that the thicknesses become thicker from the central portions toward the outer peripheral portions, it is possible to obtain the optical element having the apodized characteristic in which a change in a color shade between a central portion of the optical element and an outer peripheral portion thereof is small.

Note that in the reduction coloring-type solid electrochromic layer 220 and the oxidation coloring-type solid electrochromic layer 230, similarly to the reduction coloring-type solid electrochromic layer 120 of the first embodiment, portions whose film thickness is uniform may exist. Note that in this embodiment, when the portions whose film thickness is uniform are formed, in an aspect of a complementary relationship between the reduction coloring-type solid electrochromic layer 220 and the oxidation coloring-type solid electrochromic layer 230, a point where having film-thickness uniform portions on the respective layers makes it possible to make the color shade uniform is preferred.

Figure 3B:
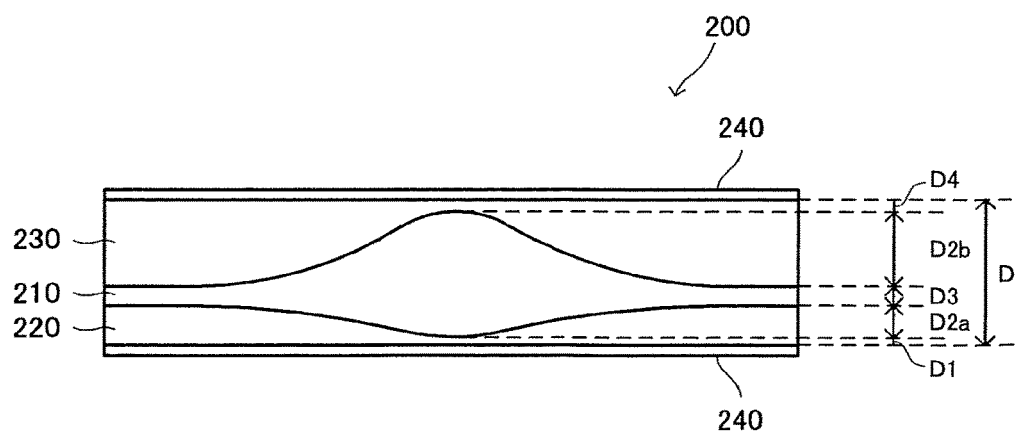
FIG. 3B is a view explaining a relationship of thicknesses of the respective elements in the optical element in FIG. 3A.

Next, in this embodiment, a relationship of a thickness of each element among the transparent electrolyte layer 210, the reduction coloring-type solid electrochromic layer 220, and the oxidation coloring-type solid electrochromic layer 230 will be described referring to FIG. 3B. FIG. 3B illustrates the same cross sectional view as the cross sectional view of the optical element in FIG. 3A and a view for explaining the relationship of the thickness among the respective layers.

"Functional layer" is defined as a group of layers constituted of the transparent electrolyte layer 210, the reduction coloring-type solid electrochromic layer 220, and the oxidation coloring-type solid electrochromic layer 230 except the transparent conductive films 240 in this optical element 200. Accordingly, a characteristic of the optical element 200 can be adjusted by a configuration of this functional layer and is greatly affected mainly by the relationship of the thickness among the respective layers.

In the transparent electrolyte layer 210 included in this functional layer, as illustrated in FIG. 3A and FIG. 3B, a thickness is different between the central portion and the outer peripheral portion. A thickness of an outer peripheral end is set to $D_3$, and thicknesses which have increased at the center with respect to the $D_3$ are set to $D_{2a}$ and $D_{2b}$. That is, $D_{2a}$ represents the thickness which has increased to the reduction coloring-type solid electrochromic layer 220 side and $D_{2b}$ represents the thickness which has increased to the oxidation coloring-type solid electrochromic layer 230 side, respectively. Accordingly, the thickness of the transparent electrolyte layer 210 is $D_3$ at the outer peripheral end and $(D_{2a}+D_{2b}+D_3)$ at the center.

Further, in this functional layer, when a thickness between the center of the reduction coloring-type solid electrochromic layer 220 and the transparent conductive film 240 (lower side) is set to Di and a thickness between the center of the oxidation coloring-type solid electrochromic layer 230 and the transparent conductive film 240 (upper side) is set to $D_4$, a thickness D of the functional layer is represented by $D=D_1+D_{2a}+D_3+D_{2b}+D_4$. This functional layer is formed so that the thickness D becomes substantially uniform, and both principle surfaces which form the functional layer are substantially parallel.

Note that $D_1$ is equal to a thickness of the center of the reduction coloring-type solid electrochromic layer 220 and $D_{2a}$ is equal to a thickness which has increased at an outer peripheral end with respect to the thickness of the center thereof, respectively. Moreover, $D_4$ is equal to a thickness of the center of the oxidation coloring-type solid electrochromic layer 230 and $D_{2b}$ is equal to a thickness which has increased at an outer peripheral end with respect to the thickness of the center thereof, respectively.

In this functional layer, the thicknesses $D_1$ and $D_{2a}$ in the reduction coloring-type solid electrochromic layer 220 need not correspond with the thicknesses $D_4$ and $D_{2b}$ in the opposite oxidation coloring-type solid electrochromic layer 230, respectively. Moreover, the thickness $(D_1+D_{2a})$ of the reduction coloring-type solid electrochromic layer 220 and the thickness $(D_4+D_{2b})$ of the oxidation coloring-type solid electrochromic layer 230 need not necessarily correspond either. These thicknesses, in consideration of light transmittance of a visible light wavelength band, wavelength dispersion, or the like, may be formed so that $D_1$ and $D_4$, $D_{2a}$ and $D_{2b}$, and $(D_1+D_{2a})$ and $(D_4+D_{2b})$ each have a certain relationship in positions on a concentric circle from the center of the optical element. Note that when the thickness of the oxidation coloring-type solid electrochromic layer 230 becomes too thick, electrochemical efficiency decreases. Accordingly, $(D_4+D_{2b}) \leq 1300$ nm and
$0.7 \leq (D_1+D_{2a})/(D_4+D_{2b}) \leq 1.3$ are preferred,
$(D_4+D_{2b}) \leq 1000$ nm and
$0.7 \leq (D_1+D_{2a})/(D_4+D_{2a}) \leq 1.3$ are more preferred, and
$(D_4+D_{2b}) \leq 700$ nm and
$0.7 \leq (D_1+D_{2a})/(D_4+D_{2b}) \leq 1.3$ are further preferred.

Further, when a material of the transparent electrolyte layer is an organic gel polymer electrolyte, it is strong in mechanical deformation in particular, which is preferred, and in the thickness thereof, the following relational expression $$0.5 \ \mu m \leq (D_{2a}+D_{2b}+D_3) \leq 20 \ \mu m$$

is preferably satisfied. In the above-described relational expression, as long as the thickness $D_{2a}+D_{2b}+D_3$ is less than 0.5 μm, there is a possibility of lack in electron blocking ability and a short circuit, and on the other hand, as long as the thickness $D_{2a}+D_{2b}+D_3$ is more than 20 μm, there is a possibility that movement of ions becomes slow to decrease a response characteristic.

Note that in the second embodiment, both thicknesses of the reduction coloring-type solid electrochromic layer 220 and the oxidation coloring-type solid electrochromic layer 230 roughly increase gradually from the central portions toward the outer peripheral portions. Thereby, a color tone is neutral widely across a visible wavelength band and it is possible to make a dynamic range of the apodized characteristic large. Note that the thicknesses of both the solid electrochromic layers need not be the same as each other, but a gradually increasing ratio of the thicknesses of both the solid electrochromic layers preferably approximately corresponds with each other.

In the optical element 200, an apodized function capable of controlling an area where the light transmittance decreases gradually from the central portion toward the outer peripheral portion can be obtained, and further it is possible to optionally design a (pupil) area of the central portion where the light transmittance is high and the area where the light transmittance decreases gradually from the central portion toward the outer peripheral portion in response to a voltage which is applied from outside.

Further, by mutually adjusting the thickness of the oxidation coloring-type solid electrochromic layer 230 which electrochemically has an oxidation-reduction complementary relationship with the reduction coloring-type solid electrochromic layer 220 in advance, a wavelength spectral characteristic in a specific position can be adjusted. This makes it possible to obtain uniform color image quality regardless of a wavelength band also in a voltage applied state where an intermediate transmittance is indicated.

Optical Characteristic

Figure 4:
FIG. 4 is conceptual diagrams explaining relationships of externally applied voltages, appearances, and transmittance characteristics in an optical element of the present invention.
Figure 4:
Figure 4:
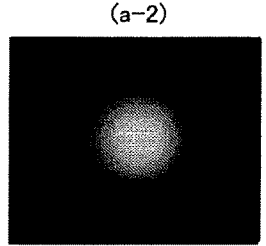
Figure 4:
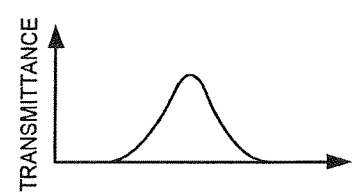
Figure 4:
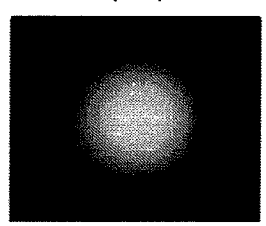
Figure 4:
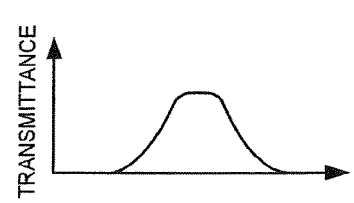
Figure 4:
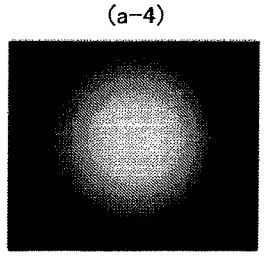
Figure 4:
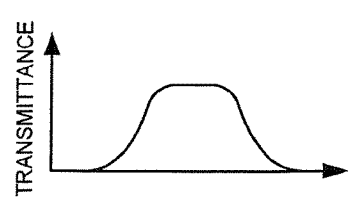
Figure 4:
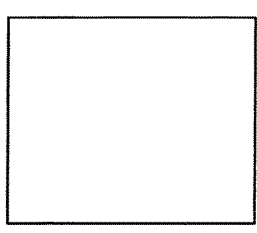
Figure 4:
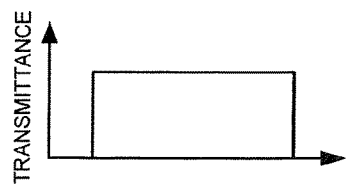

Hereinafter, an optical characteristic of the optical element 200 in the above-described second embodiment will be described. FIG. 4 illustrates relationships between color development states of light-absorbing variable parts constituted of the solid electrochromic layers and light transmittance characteristics when a voltage which is applied to the optical element is changed, and hereinafter, a specific description will be made.

$V=V_1$ is applied as voltage V so that the reduction coloring-type solid electrochromic layer 220 becomes positive polarity and the oxidation coloring-type solid electrochromic layer 230 becomes negative polarity, and thereby both the chromic layers become in the color development state and become in a state (FIG. 4(*a*-1), (*b*-1)) of shielding visible light in the entire drive area region of this optical element. Note that the later-described (both) terminals correspond to a pair of the transparent conductive film 240.

Here, $V=V_2$ (where $|V_2|<|V_1|$ is satisfied) is applied as voltage V between both terminals of the reduction coloring-type solid electrochromic layer 220 and the oxidation coloring-type solid electrochromic layer 230, and thereby the color development state of both the solid electrochromic layers becomes a trend to reduce color together and become in a state (FIG. 4(*a*-2), (*b*-2)) where visible light transmits at the central portion of the optical element depending on the thicknesses of the solid electrochromic layers of this optical element. Moreover, $V=V_3$ and $V=V_4$ (where $|V_4|<|V_3|<|V_2|$ is satisfied) are applied as voltage V, and thereby the color development state of both the solid electrochromic layers becomes a trend to further reduce color together as an absolute value of voltage becomes small. In other words, depending on the thicknesses of the solid electrochromic layers of this optical element, the state where visible light transmits at the central portion of the optical element becomes (FIG. 4(*a*-3), (*b*-3)) when $V=V_3$ is applied, and the state becomes (FIG. 4(*a*-4), (*b*-4)) when $V=V_4$ is applied.

Further, $V=V_5$ is applied as voltage V so that a voltage between the above-described terminals becomes reversed polarity, the reduction coloring-type solid electrochromic layer 220 becomes negative polarity, and the oxidation coloring-type solid electrochromic layer 230 becomes positive polarity, and thereby both the solid electrochromic layers become in a color reduction state completely and becomes in a state (FIG. 4(*a*-5), (*b*-5)) of transmitting visible light in the entire drive area region of the optical element.

In this optical element, a maximum value of an applied voltage V is set at as high voltages as possible in a range where the value does not exceed overvoltage so as not to impair stability of the optical element due to occurrence of a side reaction, thereby allowing faster variable reaching a stronger color development/reduction state. An actual maximum applied voltage may be selected according to a characteristic required of the optical element, but it can be preferably controlled generally within ±3 V, preferably within ±2 V, and more preferably within ±1.5 V so that the stability of the optical element and fast variability can be obtained.

In this optical element, when the state (FIG. 4(*a*-1), (*b*-1)) of shielding the visible light in the entire drive area region of this element, which is the color development state, the state (FIG. 4(*a*-5), (*b*-5)) of transmitting the visible light in the entire drive area region of this optical element, which is the color reduction state, and intermediate states therebetween (FIGS. 4(*a*-2) to (*a*-4), (*b*-2) to (*b*-4)) are controlled by voltage (V) from outside, the thickness ($D_1+D_{2a}$) of the reduction coloring-type solid electrochromic layer 220 and the thickness ($D_4+D_{2b}$) of the oxidation coloring-type solid electrochromic layer 230 are set in consideration of optical density (OD value) necessary for this optical element. The thicker these thicknesses are, the higher light shielding performance becomes, on the other hand, because a necessary electric charge amount increases, a necessary voltage (V) becomes high, and there is a possibility that the stability of the optical element is impaired and the response characteristic in which a light intensity change is performed becomes slow as described above. Therefore, formation may be performed so that each maximum value of $D_1$ and $D_4$ is 200 nm or less, more preferably 50 nm or less. Note that here the optical density (OD value (OD (λ)) in a wavelength Xλ (nm) is defined as follows.

$$OD\ (λ)=Log_{10}\{PI\ (λ)/PT\ (λ)\}=-Log_{10}T\ (λ)$$

Here, λ represents a specific wavelength and PI (λ) represents incident light intensity (of the wavelength λ) and PT (λ) represents transmitted light intensity (of the wavelength λ), and T represents light transmittance, and the larger the OD value is, the larger an optical attenuation rate becomes.

In this optical element, without practically using the state (FIG. 4(*a*-1), (*b*-1)) of shielding the visible light in the entire drive area region as an apodized optical element, when the state (FIG. 4(*a*-5), (*b*-5)) of transmitting the visible light in the entire drive area region and the intermediate states (FIGS. 4(*a*-2) to (*a*-4), (*b*-2) to (*b*-4)) therebetween are controlled fitly by selecting voltage (V) from outside, or when control is performed only between the intermediate states (FIGS. 4(*a*-2) to (*a*-4), (*b*-2) to (*b*-4)) by selecting voltage (V) from outside, the central portion of the optical element becomes in a state of constantly transmitting visible light. In this case, an area where a constant high transmittance state is maintained at the central portion does not require both the reduction coloring-type solid electrochromic layer 220 and the oxidation coloring-type solid electrochromic layer 230. In other words, each thickness of the solid electrochromic layers is preferably $D_1=0$ and $D_4=0$. Note that in a case of $D_1=0$ and $D_4=0$, a structure in which the transparent conductive films 240 are not provided only at the central portions which are $D_1=0$ and $D_4=0$ in the entire drive area region is preferred.

On the other hand, in the structure in which the transparent conductive films 240 are not provided at the central portions, in a case where the optical element is $D_1\neq 0$ and $D_4\neq 0$, the reduction coloring-type solid electrochromic layer 220 and the oxidation coloring-type solid electrochromic layer 230 need to give and receive charge while variably controlling this optical element at the central portion of the optical element, thereby greatly affecting reliability of the optical element over a long time. Further, only the oxidation coloring-type solid electrochromic layer 230 contributes to the color development/reduction in the case of $D_1=0$ and $D_4\neq 0$ or only the reduction coloring-type solid electrochromic layer 220 contributes to the color development/reduction in the case of $D_1\neq 0$ and $D_4=0$, so that the neutral color tone of the visible wavelength band when both the solid electrochromic layers are complementary to each other collapses to become bluish or become browny, and thereby there is a possibility of inaptitude for an imaging device. Therefore, when only either value of $D_1$ and $D_4$ is zero, a structure in which the transparent conductive film 240 is provided also at the central portion which is $D_1=0$ or $D_4=0$ is preferred.

Note that an area of a region which is not optically necessary (where transmission and light shielding are not controlled) as the imaging device may be determined in consideration of a characteristic of the imaging device in which this optical element is mounted.

Further, in this embodiment, in a cases of the optical element which constantly transmits visible light at the central portion regardless of a state of voltage application (controlling FIGS. 4(*a*-2) to (*a*-4), (*b*-2) to (*b*-4)), since the state (FIG. 4 (a-1), (b-1)) of shielding the visible light in the entire drive area region of the optical element is not necessary, the thickness Di and the thickness D4 may be formed so as to be zero. Further, since areas where these thickness $D_1$ and thickness $D_4$ are zero does not require external voltage application, the transparent conductive films 240 in contact therewith need not be provided with the same area opposite to each other as described above, but in order to refresh coloring due to leakage charge at the central portions of the reduction coloring-type solid electrochromic layer 220 and the oxidation coloring-type solid electrochromic layer 230, the transparent conductive films 240 are rather preferably provided even in the areas where these thickness Di and thickness $D_4$ are zero. The transparent conductive films 240 having central areas where these thickness $D_1$ and thickness $D_4$ are zero and optical element areas other than them where external field application is controlled may be integrated or divided in the optical element. When the transparent conductive films 240 are divided, contrivance for avoiding visible voltage-applied wiring in the element (so-called electrode-bone visible phenomenon) is required, and thereby the transparent conductive films corresponding to the terminals in the optical element are preferably integrated.

Further, distributions of light transmittance from the central portion of this optical element toward a peripheral portion thereof decrease gradually regardless of applied voltages except the state of (FIG. 4(a-1), (b-1)), but the gradually decreasing transmittance line (profile of light transmittance) is preferably as smooth a curve as possible.

For example, when the light transmittance is given by a Gaussian function which is expressed next, $$f(x)=\exp(-x^2/(2\sigma^2))$$

it is represented thereby. Note that in this Gaussian function, σ is a real number. In the above-described function, σ may be determined depending on a half value width of the light transmittance, and for example, when the light transmittance is set to 50% in a radius of 1 mm, σ may be set to 0.85.

Further, in this embodiment, both the reduction coloring-type solid electrochromic layer and the oxidation coloring-type solid electrochromic layer develop color complementarily by voltage application with the transparent electrolyte layer interposed therebetween. Accordingly, compared with a system in which the solid electrochromic layer develops and reduces color alone, in any of a color-reduction transmission state where the light transmittance becomes 80% or more, an intermediate transmission state where the light transmittance becomes about 50%, or a color-development light-shielding state where the light transmittance becomes 10% or less, in a wavelength of 632 nm, the wavelength dispersion of the light transmittance can approach a flat in the visible light wavelength band, which is therefore preferred.

Specifically, for example, in a case of the optical element in which WO3 is used alone as the reduction coloring-type solid electrochromic layer, a light absorption rate relatively decreases by reduction across an infrared region from a region closer to a long wavelength side than a region of a short wavelength side in the visible light wavelength band, and the color tone sometimes changes from colorlessness into deep blue. In particular, this separation from neutrality of the color tone is visually recognized also by human eyes in the intermediate transmission state where the light transmittance becomes about 50% and becomes a large factor of a color collapse defect also in an image sensor in a camera module.

Meanwhile, for example, in a case of the optical element in which NiO is used alone as the oxidation coloring-type solid electrochromic layer, a variable width of the transmittance in the region closer to the long wavelength side than the short wavelength side in the visible light wavelength band is small by oxidation, the light absorption rate remains relatively high across the infrared region, and the color tone changes from colorlessness into dark blown. Also in this case, similarly, this separation from the neutrality of the color tone is visually recognized also by human eyes in the intermediate transmission state where the transmittance becomes about 50% and becomes the large factor of the color collapse defect also in the image sensor in the camera module.

Therefore, in the optical element which variably controls the apodized characteristic by a voltage which is applied from outside, particularly in a semitransmissive intermediate transmission state, variation in the transmittance in the entire region of the visible wavelength band is desirably small. Hence, when maximum transmittance in wavelengths of 430 nm to 660 nm is 50% ($Tmax_{430\ to\ 660}=50$), it is necessary that transmittance ($T_{430}$) in a wavelength of 430 nm and transmittance ($T_{660}$) in a wavelength of 660 nm become $Tmax_{430\ to\ 660}-T_{430} \leq 10\%$ and $T\ max_{430\ to\ 660}-T_{660} \leq 10\%$. Because this neutrality is required in the entire area of the optical element which exhibits the apodized characteristic, a ratio between the thicknesses of both the reduction coloring-type solid electrochromic layer and the oxidation coloring-type solid electrochromic layer is preferably made fixed in a relationship of ±30% or less regardless of the area in the element.

The characteristic in a description of the light transmittance and the neutrality which are described here is preferably satisfied in the entire area of the optical element. Note that "entire area" in this description refers to the entire area where the visible light is allowed to transmit by variably changing the transmittance in the optical element. For example, a portion where the light transmittance of the visible light becomes unchangeable in application to a product, such as a fixed type aperture is not included.

According to the above-described first and second embodiments, the area where the light transmittance increases gradually from the outer peripheral portion of the optical element toward the central portion thereof (the light transmittance decreases gradually from the central portion toward the outer peripheral portion) in response to a voltage which is applied from outside is formed to obtain the apodized optical element capable of reversibly controlling this light transmittance. This control of the light transmittance can be achieved by reversibly changing and controlling the color development/reduction (absorption amount of light) in both layers of the reduction coloring-type solid electrochromic layer and the oxidation coloring-type solid electrochromic layer by applying voltage between both the transparent conductive films.

Note that here, a shape when the light transmittance increases gradually toward the central portion of the optical element is not particularly limited, but, for example, when the optical element is seen in plain view, the shape such as a circle or a polygon can be cited, and the circle is preferred in terms of manufacturing ease. The circle in the here-described shape includes circles such as a perfect circle and an ellipse, for example, the perfect circle is a shape in which the light transmittance in equidistant positions on a plane from the center of the optical element is the same and the light transmittance increases gradually from the outer periphery of the optical element toward the center thereof.

At this time, a contour of an area where the light transmittance with respect to light of the wavelength of 632 nm becomes 80% or more is preferably variable concentrically (namely, so as to become circles different in size) by controlling voltage.

In the above-described embodiment, from a point of view that the color tone is neutral with a variable area of the light transmittance being large and widely across the visible wavelength band, the reduction coloring-type solid electrochromic layer and the oxidation coloring-type solid electrochromic layer are made to exist oppositely to each other in an optical element system. Then, from the viewpoint of the dynamic range of the apodized characteristic, the reduction coloring-type solid electrochromic layer capable of making a characteristic change width thereof relatively large is preferably film-formed so that the thickness roughly increases gradually from the central portion of the optical element toward the outer peripheral portion thereof. Further, from the viewpoint of the wavelength dispersion of the light transmittance widely across the visible wavelength band, the oxidation coloring-type solid electrochromic layer is preferably film-formed so that the thickness roughly increases gradually from the central portion of the optical element toward the outer peripheral portion thereof. These configurations may be appropriately selected in consideration, according to a required characteristic of the optical element.

In this embodiment, in order to eliminate an effect of moisture, oxygen, or the like from the outer world, as necessary, flat films constituted of a transparent material may be formed as protective films on outer peripheral portions of the transparent conductive films, or transparent (support) substrates may be provided further with adhesive layers interposed therebetween. Further, in this embodiment, when the optical element is incorporated into an imaging device, a light shielding film may be provided in a position inside or outside this optical element, which has no effect on a light-intensity variable part in order to avoid light obliquely incident on a solid-state image sensor reaching the solid-state image sensor.

Manufacturing Method of Optical Element

In an optical element of the present invention, regardless of the above-exemplified embodiment, a reduction coloring-type solid electrochromic layer, an oxidation coloring-type solid electrochromic layer, and a transparent electrolyte layer and a shielding layer which are located between the layers, which are stacked, may be formed by dry film formation such as sputtering, vacuum deposition, ion plating, or pulse laser deposition, or a sol-gel based material may be cured after wet film formation. Further, both of these dry film formation and wet film formation may be fitly mixed. As long as a material is oxide or composite oxide, direct film formation is possible, after the film formation, for example, the material can also be formed into oxide by anodic oxidation in an electrolytic solution, and reactive sputtering can also be performed for a metal target under an oxygen environment.

Molding of a concave portion of each layer of the reduction coloring-type solid electrochromic layer and the oxidation coloring-type solid electrochromic layer can be achieved by an example as follows. For example, when a flat plate-shaped transparent support substrate on which a transparent conductive film is formed is used, after forming a layer by performing flat film formation with a certain thickness inside an ordinary element in advance, the molding can be achieved whether by performing dry etching such as reactive ion etching (RIE) using, for example, a circular mask to which a certain distance is put from a film formation surface, or by performing isotropic wet etching over, for example, a circular mask resist film which is brought in close contact with the film formation surface.

Further, when a method such as the deposition, the sputtering, or the ion plating is performed, the dry film formation is performed with a certain distance kept between a target material and a support substrate, for example, without bringing the circular mask in close contact with the support substrate, thereby allowing control of a shape or a thickness of the concave.

Figure 5A:
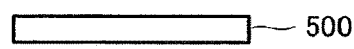
FIG. 5A is explanatory diagrams illustrating one example of concave-shaped solid electrochromic film formation having a thickness distribution of a Gaussian function.
Figure 5A:
Figure 5A:
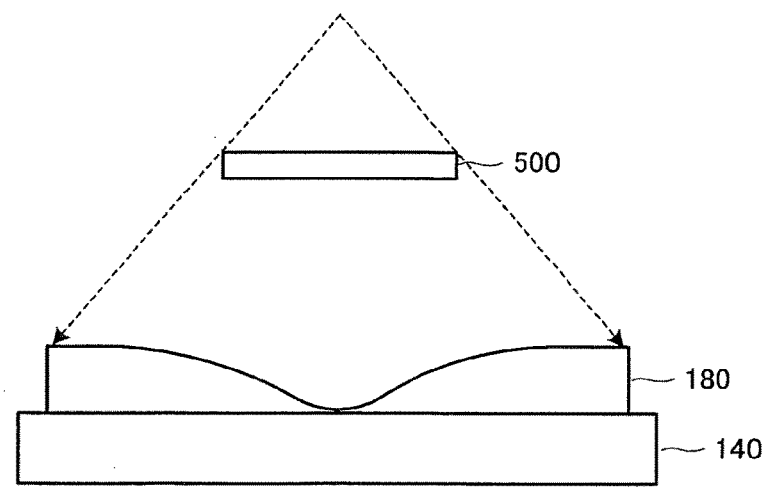

Thus, in the film formation over the mask to which a certain distance is put from the film formation surface in general, as exemplified in FIG. 5A, a transparent conductive film 140 formed on a transparent support substrate or the like is prepared (a), by performing the dry film formation on the transparent conductive film 140 with a mask 500 interposed by using a solid electrochromic material, a concave-shape solid electrochromic layer 180 whose film thickness increases gradually from a central portion toward a peripheral portion according to the Gaussian function can be film-formed (b). Note that the solid electrochromic layer 180 can be applied to both of the reduction coloring-type solid electrochromic layer and the oxidation coloring-type solid electrochromic layer.

Figure 5B:
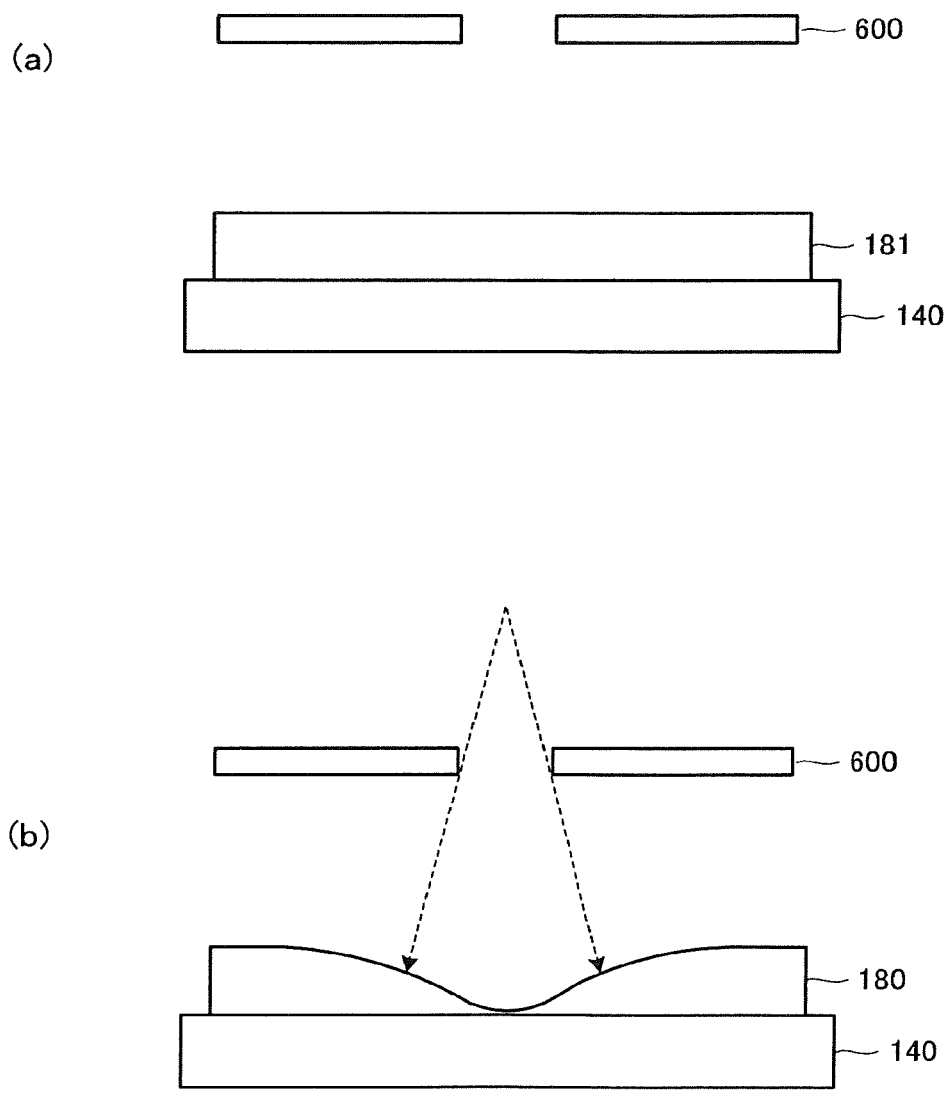
FIG. 5B is explanatory diagrams illustrating another example of concave-shaped solid electrochromic film formation having the thickness distribution of the Gaussian function.

Further, in a case of the above-described etching, as exemplified in FIG. 5B, once, after film-forming a planarizing film 181 by using the solid electrochromic material (a) on the transparent conductive film 140 formed on the transparent support substrate or the like, by performing the dry etching such as RIE over a mask 600 to which a certain distance is put from a film formation surface, the concave electrochromic layer 180 whose film thickness increases gradually from the central portion toward the peripheral portion according to the Gaussian function can be formed (b).

Further, when isotropic etching is performed by using a contact mask, a concave-shape surface of an n order function curve can be formed. A specific shape may be appropriately selected according to the required characteristic of the optical element. Here, for the dry etching of each solid electrochromic layer over the mask, as reactive gas, for example, $CCl_4$, $Cl_4$, $CF_4$, $NF_3$, or the like is used, and as necessary placing a material to be etched, in an alternating-current electrode which generates plasma makes it possible to fast obtain an etching shape having anisotropy.

Figure 6:
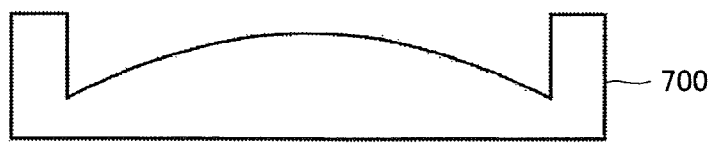
FIG. 6 is explanatory diagrams of concave-shaped solid electrochromic film formation having a thickness distribution of a quadric function.
Figure 6:
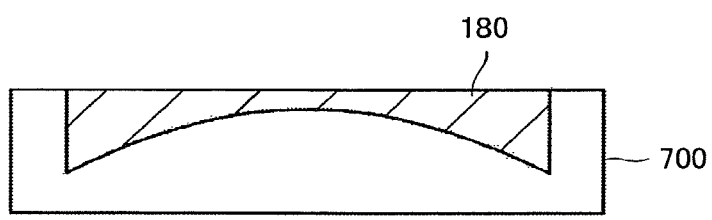
Figure 6:
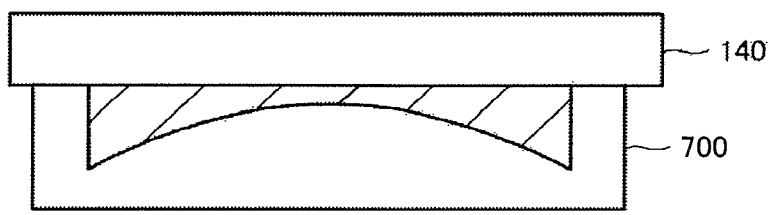
Figure 6:
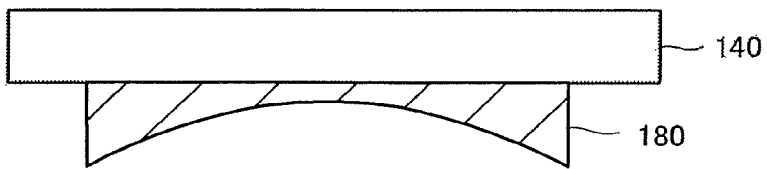

Further, a transparent support substrate subjected to convex shape processing into an optional shape in advance can also be used. In this case, the concave shape necessary for the transparent support substrate may be post-processed by wet etching or the like, or a concave molded body in an optional shape may be die-cut by imprinting a sol-gel material or resin using a mold. Here, FIG. 6 exemplifies a manufacturing method example when the convex shape of an optional cutting die is processed so as to conform to a quadratic function. In a cutting die 700 whose surface shape is processed so as to conform to the quadratic function (a), a sol-gel-based electrochromic material is applied so as to fill a processed surface, and the electrochromic material is solidified by heating decomposition (b), and by film-forming or transferring the transparent conductive film 140 (on the transparent support substrate) (c), the concave-shaped electrochromic layer 180 whose film thickness increases gradually from the central portion toward the peripheral portion can be formed (d).

Moreover, regarding a method of using the transparent support substrate molded in the convex shape and using the sol-gel material, the following manner or the like is also exemplified. When tungsten oxide is used as a reduction coloring-type electrochromic material, an aqueous solution system using tungsten hexachloride or a nonaqueous solution system using an alkoxide is used. Further, when the alkoxide of the nonaqueous solution system is used, synthesizing a composite alkoxide with an alkoxide of another element makes it possible to achieve a high function in a color adjustment such as neutralization of a color tone.

Specifically, there is known a nonaqueous sol solution alkoxylated by using the tungsten hexachloride or oxytungsten tetrachloride as a starting material, producing tungsten acetate, and dissolving the tungsten acetate in alcohol, or the like. Ketoester-based methyl acetoacetate and ethyl acetoacetate, diketone-based diacetonylacetone and trifluoroacetonylacetone, and the like may be added in this solution as a chelating agent for the purpose of a porosity adjustment and film thickening of a tungsten oxide film and stabilization of the solution, or the like.

Specifically, this alkoxide solution is film-formed on a transparent conductive film-attached convex transparent molded body by a publicly known method such as a spin-coat and heated at a desired temperature, thereby allowing film formation of tungsten oxide on the substrate. Further, as a different material system, there can also be cited, for example, iridium oxide, vanadium oxide, niobium oxide, or the like, similarly chloride or oxychloride is used as a material, for example, in a case of the iridium oxide, the nonaqueous sol solution can be adjusted from iridium tetrachloride.

Further, the same method can be used also for the other reduction coloring-type solid electrochromic material. When nickel oxide is used for material, there is known a nonaqueous sol solution alkoxidated by dissolving nickel acetate and hydrate in alcohol, or the like, and synthesizing a composite alkoxide with titanium and n-propoxide as an alkoxide of another element makes it possible to produce a composite oxide film having an optional atomic ratio from a sol solution of a nickel-titanium composite oxide and easily improve a function of the color adjustment such as the neutralization of the color tone.

For example, this sol solution of the nickel-titanium composite oxide is film-formed on the transparent conductive film-attached convex transparent molded body by the publicly known method such as the spin-coat and heated at a desired temperature, thereby film-forming the nickel-titanium composite oxide on the substrate, and with a transparent electrolyte (layer) interposed, by being sandwiched together with the transparent conductive film-attached convex transparent molded body on which tungsten oxide is film-formed, it is possible to produce this optical element.

Moreover, sequentially, in a stacking process as necessary, in order to suppress surface roughness due to a foreign matter or the like and fix a roughness, planarization treatment or the like may be performed. Moreover, in order to prevent interference and reflection due to each film formation layer and a substrate interface, a refractive index adjusting layer may be provided between the respective layers or on the substrate interface.

Film formation of the reduction coloring-type solid electrochromic layer, the oxidation coloring-type solid electrochromic layer, and the transparent electrolyte layer and the shielding layer which are located between the layers on the transparent support substrate may be performed by sequential stacking on a single surface of the substrate, or the reduction coloring-type solid electrochromic layer and the oxidation coloring-type solid electrochromic layer may be film-formed separately on the respective substrates, and thereafter combined in close contact with each other with the transparent electrolyte (layer) interposed therebetween.

The former requires a process in which the concave shape is fixed in a process of sequential film formation, but since this optical element having the support substrate only on the single surface thereof can be obtained, it can be applied by being stacked on another optical member such as a cover glass, a lens, or an IR cut filter as an optional optical member, for example, in being used as a camera module.

Further, in the latter, having the transparent support substrate on each (outside) surface of the reduction coloring-type solid electrochromic layer and the oxidation coloring-type solid electrochromic layer makes it possible to achieve this optical element having reliability and stability at a stage of combining both the substrates in close contact with each other.

At this time, any of a liquid system, a solid system, or a semisolid system can be used for the transparent electrolyte which combines the layers in close contact with each other. A concern for electrolyte leakage or the like is small in solid-based and semisolid-based electrolytes, and a gel-state material or a water or ion-containing synthetic resin material is applicable, as long as the convex shapes which follow the concave shapes of the reduction coloring-type solid electrochromic layer and the oxidation coloring-type solid electrochromic layer are easily obtained, preferable application is possible. As a process, staking may be performed as a self-supported film or applying and drying may be performed in a solution state. On the other hand, because a liquid-based electrolyte has high fluidity, it is possible to follow the above-described concave shape or convex shape easily, thereby allowing a merit to be obtained in a process in which the later-described empty cell is produced beforehand. Note that by providing the transparent support substrates on both sides, for example, when a constraint of thickness, or the like occurs in being used for the camera module or the like, thinning may be performed by performing so-called slimming processing such as post-polishing or etching.

Further, this optical element may be obtained by, separately film-forming the reduction coloring-type solid electrochromic layer and the oxidation coloring-type solid electrochromic layer on the respective transparent electrode-attached transparent support substrates on both sides thereof, (instead of the manufacturing method of combining the layers in close contact with each other with the transparent electrolyte (layer) interposed therebetween,), forming the empty cell thereafter with a seal interposed therebetween, and injecting a liquid-state transparent electrolyte under reduced pressure. In this case, since it is not necessary to combine the layers in close contact with each other with the above-described solid-based or semisolid-based transparent electrolyte interposed therebetween, there is no concern for deterioration due to leakage or the like even though the liquid-state electrolyte is used, and by forming the empty cell having high hermeticity beforehand, the optical element having high reliability can be produced. Here, the liquid-state transparent electrolyte which is injected under the reduced pressure is preferably the organic electrolyte from the viewpoint of the reliability and further preferably the Li system whose ion conductivity is high from the viewpoint of the response speed as described above.

Note that when it is necessary to block oxygen and moisture in the air in order to drive this optical element stably over a long period, the protective film may be formed according to a publicly known ordinary method. For example, a required amount of an adhesive covers an upper surface and a side surface (of a side opposite to the transparent support substrate) of this optical element having a configuration in which the layers are stacked on one transparent support substrate and this optical element may be stacked with another optical member as an optical camera module and sealed.

On the other hand, in this optical element having a configuration in which the layers are sandwiched between two transparent support substrates, an adhesive containing a spacer as necessary is applied so as to cover a peripheral portion of the optical element in the support substrates, allowing a seal of the optical element.

As a sealing material which is used here, a publicly known thermosetting or photo-curing adhesive can be used alone or in combination. Specifically, besides systems such as a silicone system, an acrylic system, an enethiol system, and an olefin system which have a functional group having a carbon-carbon unsaturated double bond, a polymerizable compound such as an epoxy system which causes a ring-opening reaction can also be used. Because polymerization shrinkage is small in such compounds, not only precision formation by using a forming die is allowed, but also it is possible to reduce a warp. In particular, a polyfunctional compound having two or more functional groups is preferably contained.

When this optical element is produced using the above-described thin-sheet transparent support substrate, a reinforcing support substrate having a thickness larger than that of the thin-sheet transparent support substrate may be temporarily attached in order to reinforce the thin-sheet transparent support substrate. When the reinforcing support substrate is used, after stacking two transparent support substrates on which the respective electrochromic layers are film-formed or forming the empty cell in advance, this optical element having a thin total thickness can be obtained by peeling the temporarily attached reinforcing support substrate. For the temporary attachment, a publicly known resin capable of peeling or the like later and adhering temporarily, or the like can be used. In a process in which each of the electrochromic layers is film-formed on a reinforcing support substrate-attached thin-sheet transparent support substrate, when a film-formation temperature thereof and a firing temperature thereafter, and further a seal curing temperature when the empty cell is formed by opposing the substrates on which each of the electrochromic layers is film-formed, and the like require high temperatures of, for example, about 150° C. to 350° C., there is a possibility that peel strength between the thin-sheet transparent support substrate and the resin which is used for temporarily attaching, or the like changes. Accordingly, the resin which is used for the temporary attachment, or the like may be selected so that a fixing position of the reinforcing support substrate and the thin-sheet transparent support substrate does not deviate from each other in a case of exposure to such a high-temperature condition in the process or so that the transparent support substrate is not damaged in peeling after too strong fixing. Specifically, there can be exemplified an acrylic resin, a urethane resin, a silicone resin, or the like, and the silicone resin excellent in heat resistance, temporary attachment strength, and removability is preferred. (reference: International Publication WO 2014-103678)

Further, after preparing a one having a thickness which allows the above-described transparent support substrate to maintain mechanical strength, in advance and completing the optical element, the transparent support substrates on both sides thereof may be subjected to slimming by physical polishing or chemical polishing (etching) to obtain this optical element whose desired total thickness is thin.

Specifically, in consideration of the total thickness of this optical element, a thickness of each of the transparent support substrates to be used is set to 0.5 mm to 0.7 mm, and as the thickness of each of the transparent support substrates which constitute this optical element, slimming treatment is performed to a range of 0.1 mm to 0.03 mm, further as necessary, to a range of 0.01 mm to 0.02 mm. As long as the thickness of the support substrate before the slimming treatment is 0.5 mm to 0.7 mm, the empty cell can be produced beforehand by opposing the respective support substrates on which the respective electrochromic layers are stacked, and further as necessary, outer peripheral portions of the opposed support substrates are subjected to outer peripheral sealing and thereafter the liquid electrolyte can be injected stably in the empty cell. Then, after injecting the liquid electrolyte in the empty cell and sealing an injection hole, for example, both surfaces may each be subjected to the slimming treatment simultaneously until a desired thickness of 0.06 mm or less in this optical element is obtained.

In a case of the slimming by the chemical polishing (etching), generally, an etching solution containing a hydrofluoric acid is general, but when the transparent support substrate is alkali-free glass, or the like, etching solution composition may be selected as necessary. (reference: Japanese Patent No. 5423874)

Imaging Device

Figure 7:
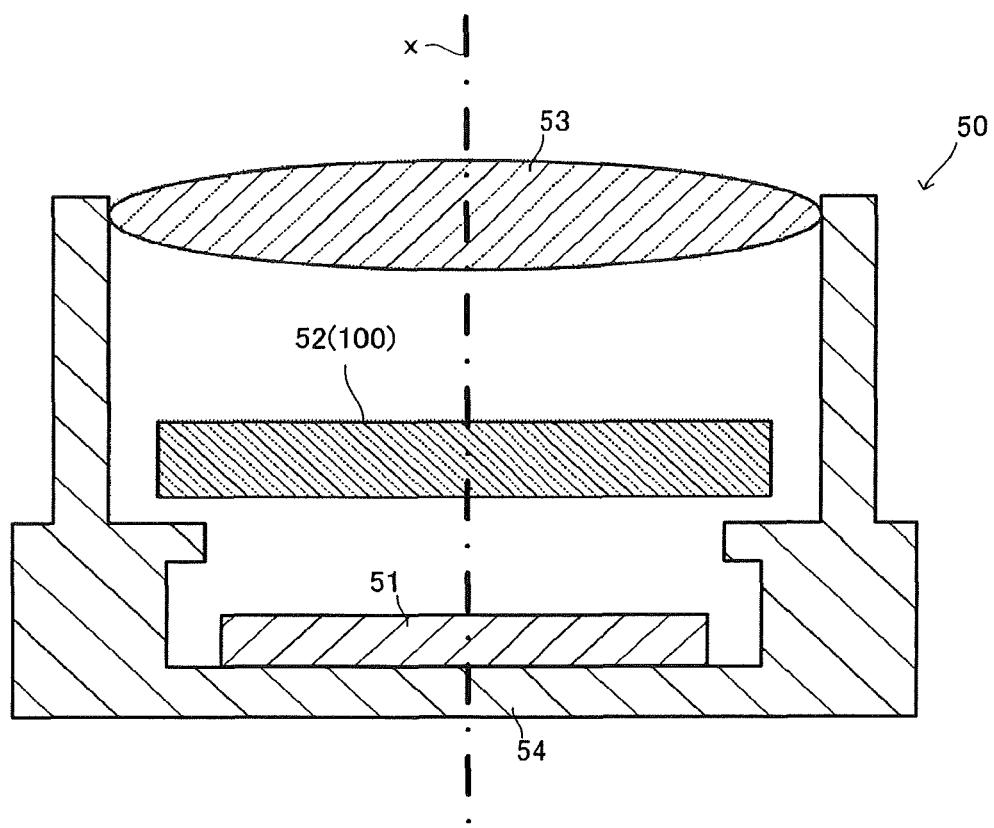
FIG. 7 is a view illustrating a schematic configuration of an imaging device which is one embodiment of the present invention.

FIG. 7 illustrates a sectional view illustrating a schematic configuration of an imaging device 50 which is an embodiment of the present invention.

As illustrated in FIG. 7, the imaging device 50 of this embodiment has a solid-state image sensor 51, an optical element 52, a lens 53, and a casing 54 which holds and fixes these.

The solid-state image sensor 51, the optical element 52, and the lens 53 are disposed along an optical axis x, and the optical element 52 is disposed between the solid-state image sensor 51 and the lens 53. The solid-state image sensor 51 is an electronic component which converts light incident through the lens 53 and the optical element 52 into an electrical signal and, for example, is CCD, CMOS, or the like. Then, in this embodiment, as the optical element 52, the optical element of the present invention (for example, the optical element 100 illustrated in FIG. 1A) is used. Note that in this embodiment, as the optical element 52, the optical element 100 illustrated in FIG. 1A is used, but the optical element illustrated in FIG. 3A or the like can also be used.

In the imaging device 50, light incident from a subject side is incident on the solid-state image sensor 51 through the lens 53 and the optical element 52 (optical element 100). The solid-state image sensor 51 converts this incident light into the electrical signal and outputs it as an image signal. The incident light is received by the solid-state image sensor 51 through the optical element 100.

At this time, the apodized characteristic can be exhibited by applying a desired voltage to the optical element 100, and an image having desired blurriness can be obtained by adjusting the light incident on the solid-state image sensor 51. In this embodiment, a degree of this blur can be changed by adjusting a voltage of the optical element 100, and it is not necessary to prepare a plurality of optical filters or replace the optical filters.

Note that in the imaging device 50 of this embodiment, one lens is only disposed, but a plurality of lenses may be provided, further, a cover glass which protects the solid-state image sensor, or the like may be disposed. Moreover, a position of the optical element is not limited between the lens and the solid-state image sensor either, and, for example, the optical element may be disposed more closely to the subject side than the lens, further, when the plurality of lenses are disposed, the optical element may be disposed between the lenses.

Moreover, the optical element which is used for the imaging device 50 of this embodiment is not only used independently as described above, but also may be used by being stacked on an optional member when it is used as the camera module, or the optional member may be used as the support substrate. For example, the optical element can be used by being stacked on the cover glass, the lens, or the IR cut filter. Further, the cover glass, the lens, or the lit cut filter can be used as the support substrate in advance. Such a configuration allows a thin and small-sized camera module and reduction in the number of parts in the camera module.

EXAMPLES

An optical element of the present invention will be described further in detail based on examples.

Example 1

In manufacturing an optical element having a configuration illustrated in FIG. 3A, first, a glass substrate (AN glass; 6 mmsquare, 0.1 mm thickness (made by ASAHI GLASS)) in which an ITO electrode (sheet resistance; 10 Ω/sq.) with a 150 nm thickness was subjected to film formation patterning as a transparent conductive film was prepared. Next, a circular metal mask of 1.5 mmφ which was fixed by a mesh wire was disposed above the center of the substrate while keeping a distance of 0.1 mm from the glass substrate, and film formation was performed using $WO_3$ which composed a reduction coloring-type solid electrochromic layer by a DC sputtering method. This made it possible to obtain a $WO_3$ film (reduction coloring-type solid electrochromic layer) in which a formed film thickness increased gradually from a surface of the glass right below the center of the mask toward an outer peripheral portion. Formation of the $WO_3$ film was performed by adjusting a sputtering condition so that a thickness of $WO_3$ at an element outermost peripheral portion which was unaffected by the mask became 500 nm, and further, a film was formed on the $WO_3$ film as a shielding layer using $Ta_2O_5$ by sputtering so that a thickness thereof became 40 nm.

Note that a film formation condition of the $WO_3$ film was set to a substrate temperature: room temperature, a sputtering atmosphere: $Ar/O_2$ mixed gas (ratio 1:4), supply power: 300 W, and process pressure, 5 Pa, using tungsten as a target material. Further, the film formation condition of a $Ta_2O_5$ film was set to the substrate temperature: room temperature, the sputtering atmosphere: $Ar/O_2$ mixed gas (ratio 19:1), the supply power: 300 W, the process pressure 5 Pa, using tantalum as the target material.

Next, in the same specification as the formation of the reduction coloring-type solid electrochromic layer, a glass substrate (AN glass; 6 mmsquare, 0.1 mm thickness (made by ASAHI GLASS)) in which an ITO electrode (sheet resistance; 10 Ω/sq.) with a 150 nm thickness was subjected to film formation patterning as a transparent conductive film was prepared. Next, a circular metal mask with a diameter of 1.5 mmφ) (15 mmφ) which was fixed by a mesh wire was disposed above the center of the substrate while keeping a distance of 0.1 mm from the glass substrate, and film formation was performed using NiO which composed an oxidation coloring-type solid electrochromic layer by the DC sputtering method. Similarly to the formation of the reduction coloring-type solid electrochromic layer, it was possible to obtain NiO (oxidation coloring-type solid electrochromic layer) in which a formed film thickness increased gradually from the center of the glass substrate toward an outer peripheral portion. Formation of a NiO film was performed by adjusting the sputtering condition so that a thickness of NiO at an element outer peripheral portion which was unaffected by the mask became 600 nm, and further, a film was formed on the NiO film as the shielding layer using $Ta_2O_5$ by the sputtering so that a thickness thereof became 40 nm.

Note that the film formation condition of the NiO film was set to the substrate temperature: room temperature, the sputtering atmosphere: $Ar/O_2$ mixed gas (ratio 6:1), the supply power: 300 W, the process pressure, 5 Pa, using nickel as the target material. The film formation condition of the $Ta_2O_5$ film is the above-described same condition as that of the above-described formation of the reduction coloring-type solid electrochromic layer, under which film formation was performed.

A transparent electrolyte resin dispersion was evenly applied using a spin coater, to each of both substrate sides of the shielding layer ($Ta_2O_5$) side of the glass substrate on which the obtained reduction coloring-type solid electrochromic layer was formed and the shielding layer ($Ta_2O_5$) side of the glass substrate on which the oxidation coloring-type solid electrochromic layer was formed, and dried at room temperature, and a transparent electrolyte having a thickness of about 4 μm was film-formed. Note that as the electrolyte resin dispersion, a dispersion whose solid content concentration became 20 mass % by dispersing a copolymer (ion exchange capacity 1.4 mEq/g dry resin) obtained by hydrolyzing and converting into an acid form in a mixed solution of ethanol and water (water/EtOH=4/6) after copolymerizing tetrafluoroethylene and $CF_2=CFOCF_2CF(CF_3)O(CF_2)_2SO_2F$ was used.

Thereafter, with the respective patterned electrode portions of both the glass substrates being positioned outside, stacking was performed so that transparent electrolyte layers opposed each other, and compression bonding was performed at a temperature of 150° C. and at a contact pressure of 3.0 MPa using a thermocompression bonding machine.

Moreover, a power supply-attached optical element having an apodized characteristic was manufactured by connecting a pair of electrodes (transparent conductive films) and a direct-current power supply by lead wiring and sealing with an epoxy resin. Here, when voltage was applied between a pair of the electrodes so as to become an inter-terminal voltage of +3.0 V (the electrode on the oxidation coloring-type solid electrochromic layer side became positive), both the reduction coloring-type solid electrochromic layer ($WO_3$ film) and the oxidation coloring-type solid electrochromic layer (NiO film) developed color strongly, resulting in a decrease in transmittance of incident light.

The transmittance (hereinafter, a measuring wavelength was 632 nm) at the element outer peripheral portion where the thicknesses of the reduction coloring-type solid electrochromic layer and the oxidation coloring-type solid electrochromic layer were relatively large was 1.0%, and the transmittance was 7.3% at the inter-terminal voltage of +1.5 V. In this applied voltage state, the transmittance was 82% at a central portion of this element and 43% when an intermediate portion of 0.7 mm from the center of the substrate, where the thickness increased gradually was set as a measuring center.

Note that in this intermediate portion, a wavelength which became 50% ($Tmax_{430\ to\ 660}=50$) in maximum transmittance between wavelengths 430 nm to 660 nm was 520 nm, and at this time the transmittance ($T_{430}$) in a wavelength of 430 nm was 48% and the transmittance ($T_{660}$) in a wavelength of 660 nm was 42%.

Note that the transmittance at the element outer peripheral portion when the inter-terminal voltage was further changed similarly, hereinafter, was 26% at +1.0 V, 44% at +0.8 V, 62% at +0.3 V, and 81% at −1.5 V, and the transmittance of incident light increased.

Further, when the inter-terminal voltage was larger in the positive electrode, at the central portion of this optical element, an area where the transmittance exceeded 80% became small and the area was concentric circles of 0.5 mmϕ. The transmittance always exceeded 80% regardless of magnitude of an applied voltage value, and this made an inter-terminal voltage value of this optical element small, and thereby the concentric circles of the area where the transmittance exceeded 80% increased gradually, and the transmittance exceeded 80% finally at −1.5 V in the entire area of this optical element.

That is, it was possible to confirm that the obtained optical element had a transmission state across the entire area of the element and the apodized characteristic in which a central transmission area was variably controlled by voltage application.

Example 2

Liquid-state electrolyte cell production process

An electrochromic film area is surrounded at an outer peripheral portion of an electrode side of a glass substrate on which a reduction coloring-type solid electrochromic layer produced similarly to Example 1 is formed, and an UV-curing type adhesive made by ThreeBond Co., Ltd. (model number: TB3035B) is coated with a 0.5 mm width using a dispenser so as to become a shape in which an inlet for injecting an electrolyte is provided. Next, a glass substrate on which the oxidation coloring-type solid electrochromic layer is formed is laminated so that the electrode sides oppose each other with the respective patterned electrode portions being positioned outside similarly to Example 1, and an exposure is performed at 85 mW/cm² for 40 seconds by an UV exposure device to produce an empty cell.

The obtained empty cell and a liquid-state electrolyte (electrolyte solution made by KISHIDA CHEMICAL Co., Ltd., product name: LBG-00003; 1 mol/L $LiN(SO_2CF_3)_2$ propylene carbonate solvent) are put in a vacuum chamber and air inside the chamber is discharged by a vacuum pump, and after remaining as they are at 1 kPa for 10 minutes, an inlet of the empty cell is turned downward and the inlet and the liquid-state electrolyte are brought in contact with each other. By opening the chamber inside to the air as it is, the liquid-state electrolyte is injected in the empty cell (vacuum differential pressure injection method). The cell in which the electrolyte has been injected is taken out from the vacuum chamber inside, the inlet is coated with the above-described adhesive and sealed by the exposure under the same condition. Moreover, a power supply-attached optical element having an apodized characteristic is manufactured by connecting a pair of electrodes (transparent conductive films) and a direct-current power supply by lead wiring and sealing with an epoxy resin. The optical element obtained as described above is considered to have an equal characteristic to the optical element obtained in Example 1.

An optical element of the present invention exhibits an apodized characteristic by applying voltage, and allows a light transmittance characteristic thereof to be changed at desired timing and a rate.

What is claimed is:

1. An optical element comprising:
   a transparent electrolyte layer;
   a pair of solid electrochromic layers constituted by a reduction coloring-type solid electrochromic layer and an oxidation coloring-type solid electrochromic layer opposing each other, sandwiching the transparent electrolyte layer; and
   a pair of transparent conductive films which sandwiches a pair of the solid electrochromic layers,
   the optical element having an apodized characteristic having transmittance gradually increasing from an outer periphery toward a center in a plane orthogonal to a thickness direction of the transparent electrolyte layer.

2. The optical element according to claim 1, wherein the transmittance in the apodized characteristic in a same distance from the center of the optical element becomes substantially same.

3. The optical element according to claim 1, further comprising:
   a transparent substrate on at least one film of the pair of transparent conductive films.

4. The optical element according to claim 1, further comprising:
   a shielding layer at least one of: between the transparent electrolyte layer and the reduction coloring-type solid electrochromic layer; and between the transparent electrolyte layer and the oxidation coloring-type solid electrochromic layer.

5. The optical element according to claim 1, wherein a contour of an area in the plane where the transmittance with respect to light of a wavelength of 632 nm becomes 80% or more is concentrically variable by controlling a voltage which is applied between a pair of the transparent conductive films.

6. The optical element according to claim 1, wherein the area in the plane where the transmittance with respect to the light of the wavelength of 632 nm becomes 80% or more is filled in an entire area by setting the voltage which is applied between a pair of the transparent conductive films to a predetermined value.

7. The optical element according to claim 1, wherein an area in the plane where the transmittance with respect to the light of the wavelength of 632 nm becomes 10% or less is filled in the entire area by setting the voltage which is applied between a pair of the transparent conductive films to a predetermined value.

8. The optical element according to claim 1, wherein when the center of the optical element is set as a base point (x=0), a transmittance distribution is substantially given by a Gaussian function represented by $$f(x)=\exp(-x^2/(2\sigma^2)).$$

9. The optical element according to claim 1, wherein when maximum transmittance with respect to light in a range of wavelengths of 430 nm to 660 nm is set to $Tmax_{430\ to\ 660}$, both of transmittance $T_{430}$ with respect to light of a wavelength of 430 nm and transmittance $T_{660}$ with respect to light of a wavelength of 660 nm in $Tmax_{430\ to\ 660}=50\%$ satisfy 40% or more.

10. The optical element according to claim 1, wherein in a cross section in a thickness direction which includes the center, at least one of a shape of the reduction coloring-type solid electrochromic layer and a shape of the oxidation coloring-type solid electrochromic layer is a plano-concave shape, and a shape of the transparent electrolyte layer is a plano-convex shape or a biconvex shape.

11. The optical element according to claim 1, wherein the transparent electrolyte layer has a liquid-state material.

12. The optical element according to claim 11, wherein the liquid-state material has Li.

13. An imaging device comprising:

an image sensor configured to be incidented light from a subject or a light source;

a lens which is disposed between the subject or the light source and the image sensor; and the optical element according to claim 1 which is disposed between the subject or the light source and the image sensor.

\* \* \* \* \*